(12) United States Patent
Greenhill et al.

(10) Patent No.: US 9,982,736 B2
(45) Date of Patent: *May 29, 2018

(54) GRADIENT NANOPARTICLE-CARBON ALLOTROPE POLYMER COMPOSITE

(71) Applicant: Greenhill AntiBallistics Corporation, Mamaroneck, NY (US)

(72) Inventors: Zachary R. Greenhill, Rye, NY (US); Joseph J. Belbruno, Hanover, NH (US)

(73) Assignee: Greenhill AntiBallistics Corporation, Rye, NY (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/039,088

(22) Filed: Sep. 27, 2013

(65) Prior Publication Data

US 2014/0113086 A1 Apr. 24, 2014

Related U.S. Application Data

(63) Continuation of application No. 13/841,655, filed on Mar. 15, 2013, now abandoned, which is a
(Continued)

(51) Int. Cl.
*B32B 9/04* (2006.01)
*B32B 5/16* (2006.01)
(Continued)

(52) U.S. Cl.
CPC ............... *F16F 7/00* (2013.01); *B32B 5/16* (2013.01); *B32B 5/30* (2013.01); *B32B 9/007* (2013.01);
(Continued)

(58) Field of Classification Search
CPC ......... B82Y 15/00; B82Y 30/00; B32B 9/048; B32B 5/16; B32B 2605/00;
(Continued)

(56) References Cited

U.S. PATENT DOCUMENTS 2,978,584 A 4/1961 Loconti et al.
3,485,658 A 12/1969 Iler
(Continued)

FOREIGN PATENT DOCUMENTS

DE 3404272 10/1987
DE 3936991 10/1990
(Continued)

OTHER PUBLICATIONS

In the U.S. Patent and Trademark Office, Applicant Initiated Interview Summary in re: U.S. Appl. No. 12/672,865, dated Apr. 2, 2014, 7 pages.
(Continued)

*Primary Examiner* — Yan Lan
(74) *Attorney, Agent, or Firm* — Porzio, Bromberg & Newman P.C.

(57) ABSTRACT

Systems and methods are provided for protective devices. A protective equipment device may include a high mass member; and a nanoparticle shock wave attenuating material layer disposed on the high mass member. The nanoparticle shock wave attenuating material layer may include a gradient nanoparticle layer including a plurality of nanoparticles of different diameters that are arranged in a gradient array; and a carbon allotrope layer disposed in proximity to the gradient nanoparticle layer, the carbon allotrope layer comprising a plurality of carbon allotrope members suspended in a matrix.

21 Claims, 10 Drawing Sheets

Related U.S. Application Data continuation-in-part of application No. PCT/US2011/056696, filed on Oct. 18, 2011.

(60) Provisional application No. 61/394,066, filed on Oct. 18, 2010, provisional application No. 61/411,494, filed on Nov. 9, 2010, provisional application No. 61/477,674, filed on Apr. 21, 2011.

(51) Int. Cl.

| | | |
|---|---|---|
| *B32B 27/14* | (2006.01) | |
| *C01B 31/02* | (2006.01) | |
| *F41H 1/02* | (2006.01) | |
| *F41H 1/08* | (2006.01) | |
| *F41H 5/04* | (2006.01) | |
| *F41H 7/04* | (2006.01) | |
| *F16F 7/00* | (2006.01) | |
| *F42D 5/045* | (2006.01) | |
| *C09D 1/00* | (2006.01) | |
| *F41H 1/04* | (2006.01) | |
| *B32B 5/30* | (2006.01) | |
| *B32B 9/00* | (2006.01) | |
| *B32B 27/36* | (2006.01) | |
| *C01B 32/158* | (2017.01) | |

(52) U.S. Cl.
CPC ............ *B32B 9/048* (2013.01); *B32B 27/14* (2013.01); *B32B 27/365* (2013.01); *C01B 32/158* (2017.08); *C09D 1/00* (2013.01); *F41H 1/02* (2013.01); *F41H 1/04* (2013.01); *F41H 1/08* (2013.01); *F41H 5/04* (2013.01); *F41H 7/04* (2013.01); *F42D 5/045* (2013.01); *B32B 2264/0235* (2013.01); *B32B 2264/102* (2013.01); *B32B 2264/108* (2013.01); *B32B 2307/558* (2013.01); *B32B 2437/04* (2013.01); *B32B 2571/02* (2013.01); *B32B 2605/00* (2013.01); *Y10T 428/13* (2015.01); *Y10T 428/25* (2015.01); *Y10T 428/256* (2015.01); *Y10T 428/30* (2015.01)

(58) Field of Classification Search
CPC .......... B32B 2264/102; B32B 2437/04; B32B 2264/0235; B32B 2264/108; B32B 2307/558; B32B 2571/02; B32B 27/14; B32B 27/365; B32B 5/30; B32B 9/007; F41H 1/04; F41H 1/08; F41H 1/02; F41H 5/04; F41H 7/04; F41H 1/00; F41H 5/0414; F16F 7/00; C09D 1/00; A41D 13/015; A42B 3/063; A63B 2071/0063; A63B 71/0054; Y10T 428/13; Y10T 428/25; Y10T 428/256; Y10T 428/30; F42D 5/045; C01B 31/022; C01B 32/158
USPC ..... 428/34.1, 323, 301.1, 328; 977/742, 753
See application file for complete search history.

(56) References Cited

U.S. PATENT DOCUMENTS

| | | |
|---|---|---|
| 4,014,926 A | 3/1977 | Dear et al. |
| 4,090,967 A | 5/1978 | Falk |
| 4,179,979 A | 12/1979 | Cook et al. |
| 4,186,648 A | 2/1980 | Clausen et al. |
| 4,585,685 A | 4/1986 | Forry et al. |
| 4,719,151 A | 1/1988 | Chyung et al. |
| 5,540,951 A | 7/1996 | Nahayama et al. |
| 5,747,152 A | 5/1998 | Oka et al. |
| 5,762,841 A | 6/1998 | Shimai et al. |
| 5,834,101 A | 11/1998 | Hayashi |
| 5,942,015 A | 8/1999 | Culler et al. |
| 6,028,020 A | 2/2000 | Tanaka et al. |
| 6,225,246 B1 | 5/2001 | Darcovich |
| 6,537,654 B1 | 3/2003 | Gruber et al. |
| 6,832,735 B2 | 12/2004 | Yadav et al. |
| 7,002,754 B2 | 2/2006 | Baer et al. |
| 7,268,364 B2 | 9/2007 | Aculon |
| 7,471,503 B2 | 12/2008 | Aculon et al. |
| 7,549,366 B2 | 6/2009 | Park et al. |
| 7,625,149 B2 | 12/2009 | Aculon |
| 7,685,922 B1 | 3/2010 | Martin et al. |
| 7,691,478 B2 | 4/2010 | Aculon |
| 7,740,940 B2 | 6/2010 | Aculon |
| 7,832,023 B2 * | 11/2010 | Crisco .............................. 2/414 |
| 7,879,437 B2 | 2/2011 | Aculon |
| 7,901,777 B2 | 3/2011 | Aculon |
| 7,989,069 B2 | 8/2011 | Aculon |
| 8,025,974 B2 | 9/2011 | Aculon |
| 8,048,487 B2 | 11/2011 | Aculon |
| 8,053,081 B2 | 11/2011 | Aculon |
| 8,067,103 B2 | 11/2011 | Aculon |
| 8,178,004 B2 | 5/2012 | Aculon |
| 8,236,426 B2 | 8/2012 | Aculon |
| 9,060,560 B2 | 6/2015 | Greenhill et al. |
| 9,328,788 B2 | 5/2016 | Greenhill et al. |
| 2003/0031438 A1 | 2/2003 | Kambe et al. |
| 2003/0044543 A1 | 3/2003 | Okamoto |
| 2003/0122111 A1* | 7/2003 | Glatkowski .................. 252/500 |
| 2004/0007702 A1 | 1/2004 | Avniel et al. |
| 2004/0038007 A1 | 2/2004 | Kotov et al. |
| 2004/0071422 A1 | 4/2004 | Aylward et al. |
| 2004/0247808 A1 | 12/2004 | Cooper et al. |
| 2005/0066805 A1 | 3/2005 | Park et al. |
| 2005/0158551 A1 | 7/2005 | Rhoads et al. |
| 2005/0159001 A1 | 7/2005 | Kim et al. |
| 2005/0189014 A1 | 9/2005 | Gaudiana et al. |
| 2006/0011054 A1 | 1/2006 | Walthall et al. |
| 2006/0286883 A1 | 12/2006 | Brown et al. |
| 2007/0003753 A1 | 1/2007 | Asgari |
| 2007/0220662 A1 | 9/2007 | Pierce |
| 2007/0293107 A1 | 12/2007 | Follo et al. |
| 2007/0295242 A1 | 12/2007 | Shim et al. |
| 2008/0108122 A1 | 5/2008 | Paul et al. |
| 2008/0131709 A1 | 6/2008 | Hanson et al. |
| 2008/0286559 A1 | 11/2008 | Lee et al. |
| 2009/0087644 A1 | 4/2009 | Supriya et al. |
| 2009/0130425 A1 | 5/2009 | Whitaker |
| 2009/0217812 A1 | 9/2009 | Whitaker et al. |
| 2009/0314350 A1 | 12/2009 | Jung et al. |
| 2009/0324910 A1 | 12/2009 | Gemici et al. |
| 2010/0012004 A1 | 1/2010 | Telander |
| 2010/0178512 A1 | 7/2010 | Giesenberg et al. |
| 2010/0215985 A1 | 8/2010 | Kitano |
| 2011/0091729 A1 | 4/2011 | Hanson |
| 2011/0168003 A1 | 7/2011 | Kim |
| 2011/0192274 A1 | 8/2011 | Fingerhut |
| 2011/0195246 A1 | 8/2011 | Hanson et al. |
| 2011/0198113 A1 | 8/2011 | Hanson |
| 2011/0212320 A1 | 9/2011 | Greenhill et al. |
| 2011/0314997 A1 | 12/2011 | Carberry et al. |
| 2012/0003481 A1 | 1/2012 | Hanson |
| 2012/0004388 A1 | 1/2012 | Hanson |
| 2012/0088036 A1 | 4/2012 | Greenhill et al. |
| 2012/0291620 A1 | 11/2012 | Yeshurun |
| 2013/0006205 A1 | 1/2013 | McKiernan et al. |
| 2013/0126146 A1 | 5/2013 | Chiang |
| 2013/0273273 A1* | 10/2013 | Greenhill et al. ........... 428/34.1 |
| 2014/0023805 A1* | 1/2014 | Greenhill et al. ........... 428/34.1 |
| 2014/0099472 A1 | 4/2014 | Greenhill et al. |
| 2014/0113086 A1 | 4/2014 | Greenhill et al. |
| 2015/0194713 A1 | 7/2015 | Jin et al. |
| 2015/0237929 A1 | 8/2015 | Greenhill et al. |
| 2016/0071655 A1 | 3/2016 | Li et al. |
| 2016/0159033 A1 | 6/2016 | Greenhill et al. |

FOREIGN PATENT DOCUMENTS

| | | |
|---|---|---|
| DE | 10107340 | 8/2002 |
| DE | 10305405 | 8/2004 |
| GB | 2365750 | 2/2002 |

(56) References Cited

FOREIGN PATENT DOCUMENTS

| | | | |
|---|---|---|---|
| JP | 2001129906 | | 5/2001 |
| JP | 2001-192275 | | 7/2001 |
| JP | 03-224577 | | 10/2001 |
| JP | 2008-169935 | | 7/2008 |
| JP | 2015-052095 | | 3/2015 |
| WO | WO-2003/025493 A2 | | 3/2003 |
| WO | WO-2008/054867 | | 5/2008 |
| WO | WO2009/058453 | * | 5/2009 |
| WO | WO-2009/058453 | | 5/2009 |
| WO | WO-2009/143405 | | 11/2009 |
| WO | WO-2010/019609 | | 2/2010 |
| WO | WO-2010/019612 | | 2/2010 |
| WO | WO-2012/054472 | | 4/2012 |
| WO | WO-2014/008031 | | 1/2014 |
| WO | WO-2014/197082 | | 12/2014 |
| WO | WO-2017/177040 | | 10/2017 |

OTHER PUBLICATIONS

In the U.S. Patent and Trademark Office, Applicant Intitiated Interview Summary in re: U.S. Appl. No. 12/672,865, dated Nov. 28, 2012, 9 pages.
In the U.S. Patent and Trademark Office, Office Action in re: U.S. Appl. No. 12/672,865, dated Jan. 16, 2014, 23 pages.
In the U.S. Patent and Trademark Office, Office Action in re: U.S. Appl. No. 13/314,472, dated Aug. 8, 2012, 16 pages.
In the U.S. Patent and Trademark Office, Office Action in re: U.S. Appl. No. 14/035,531, dated Dec. 30, 2013, 6 pages.
International Search Report for related International Application No. PCT/US2013/047515, dated Nov. 22, 2013.
In the U.S. Patent and Trademark Office, Final Office Action in re: U.S. Appl. No. 12/672,865, dated Sep. 27, 2012, 17 pages.
In the U.S. Patent and Trademark Office, Office Action in re: U.S. Appl. No. 12/672,865, dated Mar. 23, 2012, 11 pages.
International Search Report in related International Application No. PCT/US2011/056696, dated May 8, 2012.
Institute of Materials Research and Engineering Media Release, "Body armour and protective sports padding made from cornstarch solution?" Jul. 28, 2010, 4 pages.
International Search Report for related International Application No. PCT/US2008/072808, dated Sep. 17, 2009.
International Search Report for related International Application No. PCT/US2009/053462, dated Oct. 19, 2009.
International Search Report for related International Application No. PCT/US2009/053465, dated Jul. 26, 2010.
U.S. Environmental Protection Agency, "Colorimetric Screening Procedure for RDX and HMX in Soil," EPA Method 8510 [online], Revision 0, Feb. 2007 [retrieved on Jul. 24, 2012]. Retrieved from the Internet: <URL: http://www.caslab.com/EPA-Methods/PDF/EPA-Method-8510.pdf>.
Zhang et al., "Self Cleaning Particle Coating with Antireflection Properties," *Chem. Mater.*, 2005, 17, pp. 696-700.
In the U.S. Patent and Trademark Office, Final Office Action in re: U.S. Appl. No. 12/672,865, dated Jun. 18, 2014, 29 pages.
In the U.S. Patent and Trademark Office, Office Action in re: U.S. Appl. No. 12/672,865, dated Nov. 5, 2014, 68 pages.
In the U.S. Patent and Trademark Office, Applicant Intitiated Interview Summary in re: U.S. Appl. No. 12/672,865, dated Oct. 1, 2014, 5 pages.
In the U.S. Patent and Trademark Office, Applicant Intitiated Interview Summary in re: U.S. Appl. No. 12/672,865, dated Apr. 8, 2014, 4 pages.
In the U.S. Patent and Trademark Office, Examiner Intitiated Interview Summary in re: U.S. Appl. No. 12/672,865, dated Apr. 8, 2014, 1 pages.
In the U.S. Patent and Trademark Office, Final Office Action in re: U.S. Appl. No. 14/035,531, dated Jul. 9, 2014, 9 pages.
In the U.S. Patent and Trademark Office, Applicant Initiated Interview Summary in re: U.S. Appl. No. 14/035,531, dated Aug. 4, 2014, 3 pages.
In the U.S. Patent and Trademark Office, Examiner Initiated Interview Summary in re: U.S. Appl. No. 14/035,531, dated Oct. 8, 2014, 2 pages.
Supplementary European Search Report for related European Application No. EP 11834986, dated May 2, 2014.
International Search Report for related International Application No. PCT/US14/27822, dated Jan. 27, 2015.
U.S. Appl. No. 12/672,865, in the U.S. Patent and Trademark Office, Applicant Initiated Interview Summary dated Nov. 28, 2012, 9 pages.
U.S. Appl. No. 12/672,865, in the U.S. Patent and Trademark Office, Examiner Initiated Interview Summary dated Apr. 8, 2014, 1 pages.
U.S. Appl. No. 12/672,865, in the U.S. Patent and Trademark Office, Notice of Allowance dated May 7, 2015, 10 pages.
U.S. Appl. No. 13/839,777, in the U.S. Patent and Trademark Office, Final Office Action dated Oct. 17, 2016, 11 pages.
U.S. Appl. No. 13/839,777, in the U.S. Patent and Trademark Office, Office Action dated Aug. 8, 2017.
U.S. Appl. No. 13/839,777, in the U.S. Patent and Trademark Office, Office Action dated Feb. 11, 2016, 14 pages.
U.S. Appl. No. 13/839,777, in the U.S. Patent and Trademark Office, Requirement for Restriction/Election dated Sep. 11, 2015, 8 pages.
U.S. Appl. No. 13/841,655, in the U.S. Patent and Trademark Office, Office Action dated Nov. 27, 2015, 22 pages.
U.S. Appl. No. 13/841,655, in the U.S. Patent and Trademark Office, Requirement for Restriction/Election dated Jul. 2, 2015, 8 pages.
U.S. Appl. No. 13/880,270, in the U.S. Patent and Trademark Office, Final Office Action dated Nov. 3, 2016, 10 pages.
U.S. Appl. No. 13/880,270, in the U.S. Patent and Trademark Office, Office Action dated May 19, 2017.
U.S. Appl. No. 13/880,270, in the U.S. Patent and Trademark Office, Office Action in re: dated Jan. 29, 2016, 7 pages.
U.S. Appl. No. 14/035,531, in the U.S. Patent and Trademark Office, Final Office Action dated Nov. 19, 2015, 13 pages.
U.S. Appl. No. 14/035,531, in the U.S. Patent and Trademark Office, Notice of Allowance dated Mar. 22, 2016, 8 pages.
U.S. Appl. No. 14/035,531, in the U.S. Patent and Trademark Office, Office Action dated Feb. 24, 2015, 12 pages.
U.S. Appl. No. 14/039,088, in the U.S. Patent and Trademark Office, Final Office Action dated Feb. 4, 2015, 38 pages.
U.S. Appl. No. 14/039,088, in the U.S. Patent and Trademark Office, Office Action dated May 19, 2014, 33 pages.
U.S. Appl. No. 14/039,088, in the U.S. Patent and Trademark Office, Requirement for Restriction/Election dated Feb. 24, 2014, 6 pages.
U.S. Appl. No. 14/720,374, in the U.S. Patent and Trademark Office, Office Action dated Aug. 24, 2017.
Advanced Industrial, "Ultra High Temperature Materials," Mar. 2016, [online] [retrieved on Jun. 12, 2017]. Retrieved from the Internet: <URL: https://web.archive.org/web/20160329142934/http://www.cncplastics.com/ultrahightemp.php>.
International Search Report and Written Opinion for related International Application No. PCT/US2017/026407, dated Jun. 28, 2017.
Kawakami et al., "Bubble sheet used as impact buffer, heat insulating material, has multiple air bubbles formed on surface of base sheet arranged in mutually crossing fashion along longitudinal direction," Thomson Scientific, week 200145; vol. 2001, Nr: 45.
Leeman et al., "Varve formation and the climatice record in an Alpine proglacial lake: calibrating annually-laminated sediments against hydrological and meteorological data," The Holocene, 1994, 4:1, pp. 1-8.
Weinlick, "Additive Roll-to-Roll Manufacturing Techniques Being Developed," Mar. 2015, [online] [retrieved on Jun. 12, 2017]. Retrieved from the Internet: <URL: https://www.beyond.com/articles/additive-roll-to-roll-manufacturing-techniques-being-developed-16933-article.html>.

\* cited by examiner (a)  (b)

GRADIENT NANOPARTICLE-CARBON ALLOTROPE POLYMER COMPOSITE

CROSS-REFERENCE TO RELATED APPLICATIONS

This application is a continuation of U.S. patent application Ser. No. 13/841,655, filed Mar. 15, 2013, which is a continuation-in-part of PCT International Patent Application No. PCT/US2011/056696, filed 18 Oct. 2011, which claims the benefit of U.S. Provisional Patent Application No. 61/394,066, filed 18 Oct. 2010, U.S. Provisional Patent Application No. 61/411,494, filed 9 Nov. 2010, and U.S. Provisional Patent Application No. 61/477,674, filed 21 Apr. 2011; the contents of which are incorporated herein by reference in their entireties.

FIELD OF THE INVENTION

The present invention relates to protective materials and, more specifically, to a material that diminishes the effect of a shock wave or impact.

BACKGROUND OF THE INVENTION

Materials designed for handling the impact of an external stimulus, such as a blast, shock wave or projectiles, include, for example, woven fabrics, ceramic materials, and composite systems. KEVLAR, ZYLON, ARMOS, and SPECTRA are commercially available fabrics made from high-strength fibers. Another material is ballistic steel, which includes hardened high tensile steel, woven into fiber form. Further, boron carbide can be used as a material, for example, in the production of body armor.

Ceramic materials, in particular ceramic metal composites have found utility in light weight body armor.

Existing systems attempt to attenuate impact or shock waves by presenting a high mass material between the source of the shock wave and the thing being protected. The high mass material absorbs some of the impact or shock wave energy, thereby resulting in an impact wave or a shock wave of decreased amplitude. However, while the wave's amplitude may be decreased, it is only decreased by a certain amount and may still do considerable damage.

Therefore, there is a need for a material that disrupts an impact wave or a shock wave, thereby lessening its effect.

SUMMARY OF THE INVENTION

Embodiments of the present invention solve many of the problems and/or overcome many of the drawbacks and disadvantages of prior systems by providing systems and methods for attenuating a shock wave or impact.

Embodiments of the present invention may include a shock wave attenuating material including a plurality of shock attenuating layers each including: (i) a gradient nanoparticle layer having a plurality of nanoparticles of different diameters arranged in a gradient array; and (ii) a carbon allotrope layer disposed in proximity to the gradient nanoparticle layer, the carbon allotrope layer having a plurality of carbon allotrope members suspended in a matrix.

Certain embodiments may include a substrate layer, wherein the plurality of shock attenuating layers is disposed on the substrate layer. The gradient array may include the plurality of nanoparticles of different diameters arranged in a gradient array from smallest diameter to largest diameter. The carbon allotrope layer may be disposed adjacent to the gradient nanoparticle layer. The gradient nanoparticle layer may include nanoparticles of at least two different diameters. The plurality of shock attenuating layers may include at least 3 gradient nanoparticle layers and at least 3 carbon allotrope layers. The carbon allotrope members may be selected from a list of carbon allotropes consisting of: graphene sheets, carbon nanotubes, fullerenes, functionalized graphene sheets, functionalized carbon nanotubes, functionalized fullerenes and combinations thereof.

Certain embodiments may include a helmet. The helmet may include (a) a helmet member configured to be worn by a user; and (b) a plurality of shock attenuating layers applied to at least a portion of the helmet member, each shock attenuating layer including: (i) a gradient nanoparticle layer including a plurality of nanoparticles of different diameters that are arranged in a gradient array; and (ii) a carbon allotrope layer disposed in proximity to the gradient nanoparticle layer, the carbon allotrope layer including a plurality of carbon allotrope members suspended in a matrix.

In certain embodiments, the helmet member may include a para-aramid synthetic fiber. The helmet member may include ultra-high-molecular-weight polyethylene. The gradient nanoparticle layer may include nanoparticles of at least two different diameters. The plurality of shock attenuating layers may include at least 3 gradient nanoparticle layers and at least 3 carbon allotrope layers. The carbon allotrope members may be selected from a list of carbon allotropes consisting of: graphene sheets, carbon nanotubes, fullerenes, functionalized graphene sheets, functionalized carbon nanotubes, functionalized fullerenes and combinations thereof. The gradient array may include the plurality of nanoparticles of different diameters arranged in a gradient array from smallest diameter to largest diameter. The carbon allotrope layer may be disposed adjacent to the gradient nanoparticle layer. The helmet may be a sports helmet. The helmet may include one of vinyl nitrile, expanded polypropylene, polycarbonate, plastic. At least one element of the helmet may include enhanced polystyrene.

Certain embodiments of the present invention may include an armor unit. The armor unit may include (a) a structural element; (b) an armor plate; and (c) a plurality of shock attenuating layers disposed in a predetermined relationship with at least one of the structural element and the armor plate. Each shock attenuating layer may include (i) a gradient nanoparticle layer having a plurality of nanoparticles of different diameters that are arranged in a gradient array; and (ii) a carbon allotrope layer disposed in proximity to the gradient nanoparticle layer, the carbon allotrope layer having a plurality of carbon allotrope members suspended in a matrix.

In certain embodiments, the gradient nanoparticle layer may include nanoparticles of at least two different diameters. The plurality of shock attenuating layers may include at least 3 gradient nanoparticle layers and at least 3 carbon allotrope layers. The carbon allotrope members may be selected from a list of carbon allotropes consisting of: graphene sheets, carbon nanotubes, fullerenes, functionalized graphene sheets, functionalized carbon nanotubes, functionalized fullerenes and combinations thereof. The gradient array may include the plurality of nanoparticles of different diameters arranged in a gradient array from smallest diameter to largest diameter. The carbon allotrope layer may be disposed adjacent to the gradient nanoparticle layer. The structural element may include at least one of a ceiling, a floor or a wall of a vehicle. The structural element may include a body armor assemblage.

Certain embodiments of the present invention may include a personal body armor unit. The personal body armor unit may include (a) a ceramic plate; (b) a high mass member disposed adjacent to the ceramic plate; and (c) a nanoparticle shock wave attenuating material layer disposed on the high mass member. The nanoparticle shock wave attenuating material layer may include (i) a gradient nanoparticle layer including a plurality of nanoparticles of different diameters that are arranged in a gradient array; and (ii) a carbon allotrope layer disposed in proximity to the gradient nanoparticle layer, the carbon allotrope layer comprising a plurality of carbon allotrope members suspended in a matrix.

In certain embodiments, the high mass member may include a material selected from a list of materials consisting of: ultra-high molecular weight polyethylene, a para-aramid synthetic fiber composite, a carbon fiber composite, a metal, a ceramic and combinations thereof. The nanoparticle shock wave attenuating material layer may include a plurality of shock attenuating layers. The gradient nanoparticle layer may include nanoparticles of at least two different diameters. The plurality of shock attenuating layers may include at least 3 gradient nanoparticle layers and at least 3 carbon allotrope layers. The carbon allotrope members may be selected from a list of carbon allotropes consisting of: graphene sheets, carbon nanotubes, fullerenes, functionalized graphene sheets, functionalized carbon nanotubes, functionalized fullerenes and combinations thereof. The gradient array may include the plurality of nanoparticles of different diameters arranged in a gradient array from smallest diameter to largest diameter. The carbon allotrope layer may be disposed adjacent to the gradient nanoparticle layer.

Certain embodiments of the present invention may be a sports protective equipment device. The sports protective equipment device may include a high mass member; and a nanoparticle shock wave attenuating material layer disposed on the high mass member. The nanoparticle shock wave attenuating material layer may include (i) a gradient nanoparticle layer including a plurality of nanoparticles of different diameters that are arranged in a gradient array; and (ii) a carbon allotrope layer disposed in proximity to the gradient nanoparticle layer, the carbon allotrope layer including a plurality of carbon allotrope members suspended in a matrix.

In certain embodiments, the high mass member may include a material selected from a list of materials consisting of: ultra-high molecular weight polyethylene, polycarbonate, expanded polypropylene, vinyl nitrile, ABS plastic, para-aramid synthetic fiber composite, a carbon fiber composite, and combinations thereof. The nanoparticle shock wave attenuating material layer may include a plurality of shock attenuating layers. The gradient nanoparticle layer may include nanoparticles of at least two different diameters. The plurality of shock attenuating layers may include at least 3 gradient nanoparticle layers and at least 3 carbon allotrope layers. The carbon allotrope members may be selected from a list of carbon allotropes consisting of: graphene sheets, carbon nanotubes, fullerenes, functionalized graphene sheets, functionalized carbon nanotubes, functionalized fullerenes and combinations thereof. The gradient array may include the plurality of nanoparticles of different diameters arranged in a gradient array from smallest diameter to largest diameter. The carbon allotrope layer may be disposed adjacent to the gradient nanoparticle layer.

Certain embodiments of the present invention may include a shock wave attenuating material. The shock wave attenuating material may include (a) a substrate layer; and (b) a plurality of shock attenuating layers disposed on the substrate layer. Each shock attenuating layer may include (i) a nanoparticle layer comprising a plurality of nanoparticles; and (ii) a polymer layer disposed adjacent to the gradient nanoparticle layer, wherein at least two of the nanoparticle layers in the plurality of shock attenuating layers may include different diameters of nanoparticles.

In certain embodiments, at least one nanoparticle layer may have nanoparticles with a diameter of approximately 200 nm to approximately 400 nm and at least one nanoparticle layer has nanoparticles with a diameter of approximately 160 nm to approximately 320 nm. The plurality of shock attenuating layers may include at least 3 nanoparticle layers and at least 3 polymer layers. The polymer layer may be selected from the group consisting of: graphene, fullerines, carbon nanotubes, and combinations thereof. The polymer layer may be carbon nanotubes, and the carbon nanotubes may be functionalized. The carbon nanotubes may be functionalized with carboxylic acid or amine groups. The polymer layer may include poly(4-vinylphenol) and carboxylic acid functionalized carbon nanotubes. The polymer layer may have a thickness of approximately 50 to approximately 150 nm.

Certain embodiments of the present invention may include a coating for an electronic device. The coating may include (a) a surface of an electronic device; and (b) a plurality of shock attenuating layers applied to at least a portion of the surface of the electronic device. Each shock attenuating layer may include (i) a plurality of nanoparticle layers, wherein each nanoparticle layer may include nanoparticles of approximately the same diameter, wherein at least two of the nanoparticle layers comprise nanoparticles of different diameters; and (ii) at least one carbon allotrope layer disposed in proximity to at least one of the nanoparticle layers, the at least one carbon allotrope layer may include a plurality of carbon allotrope members suspended in a matrix.

In certain embodiments, the nanoparticle layers of different diameters are arranged in a gradient array from smallest diameter to largest diameter. The carbon allotrope layer may be disposed adjacent to the at least one of the nanoparticle layers. The plurality of shock attenuating layers may include at least 3 nanoparticle layers and at least 3 carbon allotrope layers. The carbon allotrope members may be selected from a list of carbon allotropes consisting of: graphene sheets, carbon nanotubes, fullerenes, functionalized graphene sheets, functionalized carbon nanotubes, functionalized fullerenes and combinations thereof. The surface may be a casing for an electronic device. The electronic device may be selected from the group consisting of: a laptop computer, an audio device, an e-book, a computer, a television, an mp3 player, a portable DVD player, and combinations thereof. The plurality of shock attenuating layers may include a particle layer with particles of approximately 160 nm to approximately 320 nm in diameter, a carbon allotrope layer, and a particle layer with particles of approximately 200 nm to approximately 400 nm in diameter. The unit of the particle layer with particles approximately 160 nm to approximately 320 nm in diameter, the carbon allotrope layer, and the particle layer with particles approximately 200 nm to approximately 400 nm in diameter may be repeated approximately 25-300 times. The plurality of shock attenuating layers may include approximately 5 pairs of a particle layer with particles approximately 160 nm to approximately 320 nm in diameter and a particle layer with particles approximately 200 nm to approximately 400 nm in diameter. The unit of the approximately 5 pairs of particle layer with particles approximately 160 nm to approximately 320 nm in diameter and the particle layer with particles approximately 200 nm to approximately 400 nm in diameter may be repeated approximately 10-40 times. The plurality of shock attenuating layers may include a particle layer with particles approximately 110 nm in diameter, a particle layer with particles approximately 130 nm in diameter, a particle layer with particles approximately 160 nm in diameter, a particle layer with particles approximately 200 nm in diameter, a particle layer with particles approximately 220 nm in diameter, a particle layer with particles approximately 200 nm in diameter, a particle layer with particles approximately 160 nm in diameter, a particle layer with particles approximately 130 nm in diameter, and a particle layer with particles approximately 110 nm in diameter. The unit of the particle layer with particles approximately 110 nm in diameter, the particle layer with particles approximately 130 nm in diameter, the particle layer with particles approximately 160 nm in diameter, the particle layer with particles approximately 200 nm in diameter, the particle layer with particles approximately 220 nm in diameter, the particle layer with particles approximately 200 nm in diameter, the particle layer with particles approximately 160 nm in diameter, the particle layer with particles approximately 130 nm in diameter, and the particle layer with particles approximately 110 nm in diameter particle layer may be repeated at least once. At least one of the plurality of nanoparticle layers may include radio frequency shielding particles that are a metal with high conductivity or an alloy with high permeability. The radio frequency shielding particles may be selected from the group consisting of copper, nickel, nickel-iron alloys, aluminum alloys, and combinations thereof. The plurality of shock attenuating layers may include a carbon allotrope layer, a radio frequency shielding particle layer with particles approximately 5 nm to approximately 500 nm in diameter, a particle layer with particles approximately 160 nm to approximately 320 in diameter, a carbon allotrope layer, and a particle layer with particles approximately 200 nm to approximately 400 nm in diameter. The unit of the carbon allotrope layer, the radio frequency shielding particle layer with particles approximately 5 nm to approximately 500 nm in diameter, the particle layer with particles approximately 160 nm to approximately 320 in diameter, the carbon allotrope layer, and the particle layer with particles approximately 200 nm to approximately 400 nm in diameter may be repeated approximately 25-300 times. The plurality of shock attenuating layers may include a carbon allotrope layer, a radio frequency shielding particle layer with particles approximately 5 nm to approximately 500 nm in diameter, a carbon allotrope layer, a particle layer with particles approximately 160 nm to approximately 320 nm in diameter, a carbon allotrope layer, a particle layer with particles approximately 200 nm to approximately 400 nm in diameter. The unit of the carbon allotrope layer, the radio frequency shielding particle layer with particles approximately 5 nm to approximately 500 nm in diameter, the carbon allotrope layer, the particle layer with particles approximately 160 nm to approximately 320 nm in diameter, the carbon allotrope layer, the particle layer with particles approximately 200 nm to approximately 400 nm in diameter may be repeated approximately 10-40 times. The plurality of shock attenuating layers may include a carbon allotrope layer, a radio frequency shielding particle layer with particles approximately 5 nm to approximately 500 nm in diameter, a particle layer with particles approximately 110 nm in diameter, a particle layer with particles approximately 130 nm in diameter, a particle layer with particles approximately 160 nm in diameter, a particle layer with particles approximately 200 nm in diameter, a particle layer with particles approximately 220 nm particle layer, a particle layer with particles approximately 200 nm in diameter, a particle layer with particles approximately 160 nm in diameter, a particle layer with particles approximately 130 nm in diameter, and a particle layer with particles approximately 110 nm in diameter. The unit of a carbon allotrope layer, the radio frequency shielding particle layer with particles approximately 5 nm to approximately 500 nm in diameter, the particle layer with particles approximately 110 nm in diameter, the particle layer with particles approximately 130 nm in diameter, the particle layer with particles approximately 160 nm in diameter, the particle layer with particles approximately 200 nm in diameter, the particle layer with particles approximately 220 nm particle layer, the particle layer with particles approximately 200 nm in diameter, the particle layer with particles approximately 160 nm in diameter, the particle layer with particles approximately 130 nm in diameter, and the particle layer with particles approximately 110 nm in diameter may be repeated at least once. The plurality of shock attenuating layers may include a carbon allotrope layer, a radio frequency shielding particle layer with particles approximately 5 nm to approximately 500 nm in diameter, a particle layer with particles approximately 110 nm in diameter, a particle layer with particles approximately 130 nm in diameter, a particle layer with particles approximately 160 nm in diameter, a particle layer with particles approximately 200 nm in diameter, a particle layer with particles approximately 220 nm in diameter, a particle layer with particles approximately 200 nm in diameter, a particle layer with particles approximately 160 nm in diameter, a particle layer with particles approximately 130 nm in diameter, and a particle layer with particles approximately 110 nm in diameter. The unit of the carbon allotrope layer, the radio frequency shielding particle layer with particles approximately 5 nm to approximately 500 nm in diameter, the particle layer with particles approximately 110 nm in diameter, the particle layer with particles approximately 130 nm in diameter, the particle layer with particles approximately 160 nm in diameter, the particle layer with particles approximately 200 nm in diameter, the particle layer with particles approximately 220 nm in diameter, the particle layer with particles approximately 200 nm in diameter, the particle layer with particles approximately 160 nm in diameter, the particle layer with particles approximately 130 nm in diameter, and the particle layer with particles approximately 110 nm in diameter may be repeated at least once. The plurality of shock attenuating layers may include a carbon allotrope layer, a radio frequency shielding particle layer with particles approximately 5 nm to approximately 500 nm in diameter, a particle layer with particles approximately 160 to approximately 320 in diameter, and a particle layer with particles approximately 200-400 nm in diameter. The unit of the carbon allotrope layer, the radio frequency shielding particle layer with particles approximately 5 nm to approximately 500 nm in diameter, the particle layer with particles approximately 160 to approximately 320 in diameter, and the particle layer with particles approximately 200-400 nm in diameter may be repeated at least once. The plurality of shock attenuating layers may include a carbon allotrope layer, a radio frequency shielding particle layer with particles approximately 5 nm-500 nm in diameter, a particle layer with particles approximately 160 nm-320 nm in diameter, a particle layer with particles approximately 200-400 nm in diameter, a radio frequency shielding particle layer with particles approximately 5 nm-500 nm in diameter, a particle layer with particles approximately 160 nm-320 nm in diameter, a particle layer with particles approximately 200-400 nm in diameter, a radio frequency shielding particle layer with particles approximately 5 nm-500 nm in diameter, a particle layer with particles approximately 160 nm-320 nm in diameter, and a particle layer with particles approximately 200 nm-400 nm in diameter. The unit of the carbon allotrope layer, the radio frequency shielding particle layer with particles approximately 5 nm-500 nm in diameter, the particle layer with particles approximately 160 nm-320 nm in diameter, the particle layer with particles approximately 200-400 nm in diameter, the radio frequency shielding particle layer with particles approximately 5 nm-500 nm in diameter, the particle layer with particles approximately 160 nm-320 nm in diameter, the particle layer with particles approximately 200-400 nm in diameter, the radio frequency shielding particle layer with particles approximately 5 nm-500 nm in diameter, the particle layer with particles approximately 160 nm-320 nm in diameter, and the particle layer with particles approximately 200 nm-400 nm in diameter may be repeated at least once.

The disadvantages of the prior systems may be overcome by the present invention which, in one aspect, may be a shock wave attenuating material that includes a substrate layer. In some embodiments, a plurality of shock attenuating layers may be disposed on the substrate layer. Each of the plurality of shock attenuating layers may include a gradient nanoparticle layer including a plurality of nanoparticles of different diameters that are arranged in a gradient array, and a carbon allotrope layer disposed adjacent to the gradient nanoparticle layer. The carbon allotrope layer may include a plurality of carbon allotrope members suspended in a matrix.

In another aspect, embodiments of the present invention may be a helmet that includes a helmet member configured to be worn by a user. A plurality of shock attenuating layers may be applied to the helmet member. Each shock attenuating layer may include a gradient nanoparticle layer including a plurality of nanoparticles of different diameters that are arranged in a gradient array, and a carbon allotrope layer disposed adjacent to the gradient nanoparticle layer, the carbon allotrope layer including a plurality of carbon allotrope members suspended in a matrix.

In another aspect, embodiments of the present invention may be an armor unit that includes a structural element, an armor plate and a plurality of shock attenuating layers. The plurality of shock attenuating layers may be disposed in a predetermined relationship with at least one of the structural element and the armor plate. Each shock attenuating layer may include a gradient nanoparticle layer including a plurality of nanoparticles of different diameters that are arranged in a gradient array, and a carbon allotrope layer disposed adjacent to the gradient nanoparticle layer, the carbon allotrope layer including a plurality of carbon allotrope members suspended in a matrix.

In yet another aspect, embodiments of the present invention may be a personal body armor unit that includes a ceramic plate, a high mass member and a nanoparticle shock wave attenuating material layer. The high mass member may be disposed adjacent to the ceramic plate. The nanoparticle shock wave attenuating material layer may be disposed on the high mass member.

The nanoparticle shock wave attenuating material layer can be disposed between the high mass member and the ceramic plate. Similarly, the nanoparticle shock wave attenuating material layer can be disposed outside of the high mass member or the ceramic plate or both. It is understood that any combination of these configurations fall within the scope of the invention.

Additional features, advantages, and embodiments of the invention are set forth or apparent from consideration of the following detailed description, drawings and claims. Moreover, it is to be understood that both the foregoing summary of the invention and the following detailed description are exemplary and intended to provide further explanation without limiting the scope of the invention as claimed.

DETAILED DESCRIPTION OF THE PREFERRED EMBODIMENTS

Figure 1:
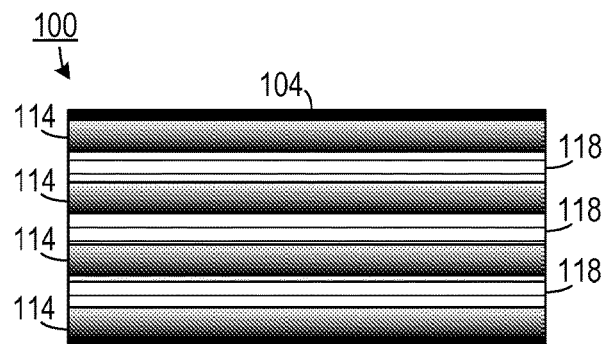
FIG. 1 is a schematic diagram of one embodiment of a shock wave attenuating material.

Certain preferred embodiments of the invention are now described in detail. Referring to the drawings, like numbers indicate like parts throughout the views. Unless otherwise specifically indicated in the disclosure that follows, the drawings are not necessarily drawn to scale. As used in the description herein and throughout the claims, the following terms take the meanings explicitly associated herein, unless the context clearly dictates otherwise: the meaning of "a," "an," and "the" includes plural reference, the meaning of "in" includes "in" and "on."

U.S. patent application Ser. No. 12/672,865 discloses a gradient nanoparticle composite material and a method of making a gradient nanoparticle composite material and is hereby incorporated by reference.

For purposes of the present invention, the terms "impact", "blast", "impact wave", "shock wave" are used for illustrative purposes. It is understood that reference herein to, for example, a shock wave from a blast would apply equally to a wave from an impact from a sports impact or any other contact that creates a disruptive force, such as dropping, bumping, striking, jostling, crushing, flexing, etc. of an object.

Embodiments of the present invention may provide a Smart Resilience Nanocomposite ["SRN"] that may cause destructive interference to attenuate a shock wave, impact or other force. The SRN may be a stack of ordered gradient nanoparticle structures of solid, hollow and/or filled nanoparticles, in a gradient array. A gradient array may be a structure that is tapered in multiple directions. Tapered in multiple direction may provide variation in particle size in multiple directions, including, but not limited to smallest to largest, largest to smallest, variable tapering, repeating patterns, etc. to create a layered structure. The stack of ordered gradient nanoparticle structure may be coated onto a substrate or may also be produced as a self-supported liner (using, for example, plastic containment).

The destructive interference effect may result from a combination of passive and active physical processes, such as absorption and distortion of the shock wave without appreciable heating. Further this effect may be independent of particle size. Nanoparticles arranged in a gradient array may create mismatching of the solitary wave at each particle contact point and, hence, attenuation of that wave. Individual particles in the final structure may be free to move relative to one another to create contact points and transfer energy.

Additionally, as the gradient arrays may be on the nanoscale, the number of ordered gradient nanoparticle structures and the corresponding attenuation may be increased without appreciable increase in weight and size. For example, a stack of 50 ordered gradient nanoparticle structures (each ordered gradient nanoparticle structure including 30 nanoparticle layers) and composite layers may result in an approximately 1 mm thick coating and significant attenuation of an incident shock wave. This structure may have a thickness of approximately 100 µm or 10 human hairs.

As such, the greater the number of ordered gradient nanoparticle structures, the greater the number of gradient arrays of nanoparticles, the greater the particle points of contact, the greater the attenuation of the shock wave and the reduction of residual force. The effect of increasing the thickness, i.e., the addition of a larger number of gradients, may decrease the amount of residual force by up to 50%. Therefore, a decision point may be the desired residual force. Once a value is selected for that attenuation point, the coating may be determined with the proper gradient and the proper number of gradient layers to reach that attenuation point.

The SRN may be a lightweight coating that does not significantly change, if at all, the flexibility of the treated material or it may be a self-sustaining material. Importantly, the SRN can be made transparent by careful choice of nanoparticle materials.

Carbon allotropes may include any form of carbon, such as diamond, graphite, graphene, fullerenes, carbon particulates, carbon nanotubes, functionalized graphene sheets, functionalized carbon nanotubes, and functionalized fullerenes, etc. The carbon allotropes may be provided as layers.

As shown in FIG. 1, one embodiment of a shock wave attenuating material 100 may include a substrate layer 104 and a plurality 110 of shock attenuating layers disposed on the substrate layer. Each of the plurality 110 of shock attenuating layers may include a gradient nanoparticle layer 114 and a carbon allotrope layer 118 disposed adjacent to the gradient nanoparticle layer 114. In a typical embodiment, the shock wave attenuating material 100 may include at least 3 gradient nanoparticle layers 114 with at least 3 carbon allotrope layers 118 (only three are shown in FIG. 1 for the sake of simplicity). The carbon allotrope layer may include carbon allotropes suspended in a matrix. The matrix may include one or more polymers or other materials.

In other embodiments of the present invention, the carbon allotrope layers 118 may be sufficiently remote from the gradient nanoparticle layers 114 so as to not be adjacent. For example, one or more layers of materials may be located between the gradient nanoparticle layers 114 and the carbon allotrope layers 118. These may include additional carbon allotrope layers, additional gradient nanoparticle layers, or layers of other materials. The layers of other materials may include coatings and/or non-gradient nanoparticle layers, such as polymer layers or other types of layers. Any additional gradient nanoparticle layers may be the same or different than the gradient nanoparticle layers.

Attenuating a shock wave or impact may occur in multiple ways. For example, an apparatus receiving a force, e.g., a flak jacket, may include an attenuating material. Alternatively, or additionally, an apparatus issuing a force, e.g., a football helmet contacting another player, may include an attenuating material.

Figure 2A:
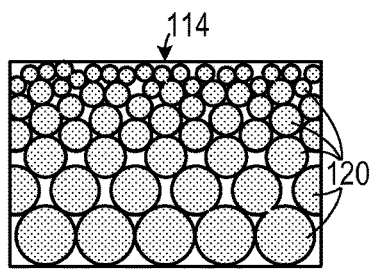
FIG. 2A is a schematic diagram of one embodiment of a gradient nanoparticle layer.

As shown in FIG. 2A, each nanoparticle layer 114 may include a plurality of nanoparticles 120 of different diameters (at least two different diameters) that are arranged in a gradient array, e.g., a structure tapered in multiple directions, from smallest diameter to largest diameter. The specific orientation of the gradient array (smallest to largest vs. largest to smallest) may depend on the specific application for which the material is being used.

Figure 2B:
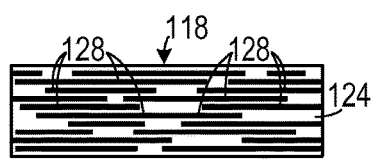
FIG. 2B is a schematic diagram of one embodiment of a carbon allotrope layer.

As shown in FIG. 2B, the carbon allotrope layer 118 may include a plurality of carbon allotrope members 128 suspended in a matrix 124. The carbon allotrope members 128 can include graphene sheets, carbon nanotubes, fullerenes, functionalized graphene sheets, functionalized carbon nanotubes, and functionalized fullerenes.

Depending upon any transparency requirement, the nature of the substrate may be varied. Two potential substrates may be polycarbonate and carbon fiber composites/laminates. In fact, a thicker (yet still transparent) polymer-graphene composite layer may be employed directly as the substrate. The gradient structure may be any of those shown, for example, in U.S. Patent Publication No. US 2011/0212320-A1, which is incorporated herein by reference, as well as others built up from the same principles. One embodiment of a gradient structure may have a total thickness of the order of 5-10 µm, which can then be repeated as many times as required.

A fullerene layer may be directly deposited by coating, from a toluene solution, onto the gradient structure in thicknesses as small as a monolayer. Similarly, carbon nanotubes and graphene or graphene oxide sheets may be coated from suspensions in organic solvents such as chloroform. However, these two allotropes may also be (preferentially) deposited as polymer composites. The use of a polymer composite provides additional structural integrity to the overall coating and, more importantly, provides additional impact regions for the generation of partially reflected shock waves and will further reduce the overall passage of the shock energy from the impact site to the protection site. Carbon allotrope members 128 can be functionalized as a graphene oxide. Similarly, nanotubes and fullerenes can be functionalized with carboxylic acid, amines, can be hydroxylated or carboxylated.

Figure 3:
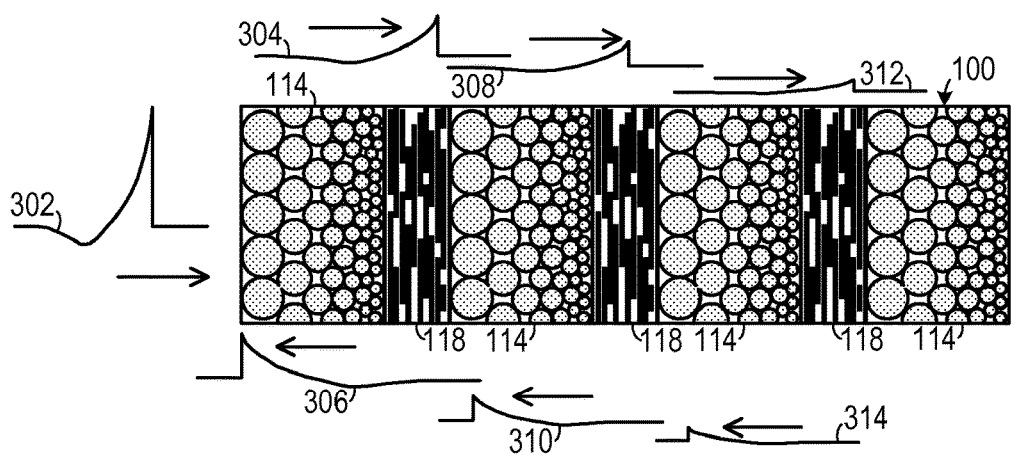
FIG. 3 is a schematic diagram of the embodiment shown in FIG. 1, demonstrating shock wave attenuation.

As shown in FIG. 3, the carbon allotrope layers 118 are of a thickness that is sufficient to reflect at least a portion of a shock wave impinging thereon. The thickness of the carbon allotrope layers 118 may depend on the type of shock wave that the designer desires to protect against. While not being limited by a particular theory, it is believed that when a shock wave 302 impinges on the material 100, the first gradient nanoparticle layer 114 begins to attenuate the shock wave 304 and the first carbon allotrope layer 118 reflects a portion of the shock wave 306, thereby generating destructive interference with any residual shock wave energy. Successive waves 308 and 312 reflect in a similar fashion to generate reflected waves 310 and 314, which further interfere with residual shock energy.

The carbon or carbon composite layers may mark the end of one nanostructure and the start of the next. A significant reduction of the incident shock wave may occur after passage through less than 10 µm of gradient nanoparticles. Stacks or layers of such structures with the carbon and/or carbon composites are interspersed and define the layer or stack limit. The effect, at each carbon interface, may be to create a backward traveling wave causing attenuation of the incident shock wave, as well as a much reduced forward transmitted shock wave, which passes in to the next layer of the structure. A stack of 50 alternating gradient nanoparticle structures (each composed of 30 nanoparticle layers) and composite layers may result in a 1 mm thick coating and significant attenuation of the incident shock wave. Each of these 50 gradient or composite layers may be one-fifth the thickness of the typical human hair.

Figure 4:
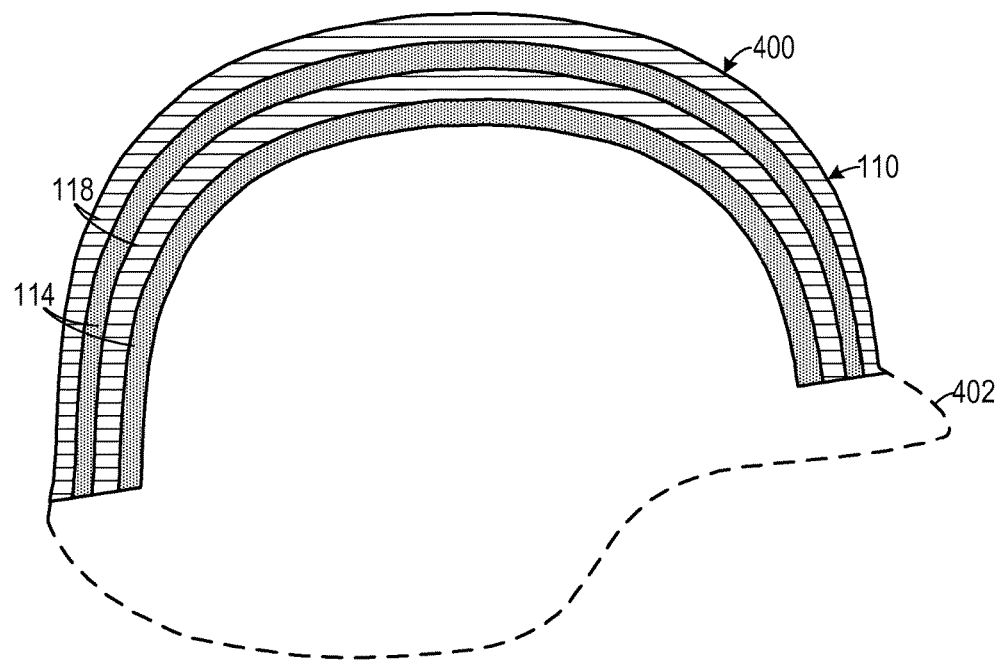
FIG. 4 is a schematic diagram of one embodiment of a helmet.

As shown in FIG. 4, the shock wave attenuating material 110 can be part of a helmet 400 or helmet liner. In one embodiment, a helmet 400 includes a helmet member 402 configured to be worn by a user, such as an Enhanced Combat Helmet [ECH] or Advanced Combat Helmet [ACH], used in military applications. The helmet member 402 could be made from ultra-high molecular weight polyethylene or a para-aramid synthetic fiber composite, such as Kevlar®. In other embodiments, the helmet could be of the type used in sports. For example, the shock wave attenuating material 110 could be used in a baseball helmet, a football helmet, a hockey helmet, a bicycling helmet, or the like. The helmet 400 could include an outer shell (such as, e.g., acrylonitrile butadiene styrene or enhanced polyethylene), a shock wave attenuating material 110 layer and an inner shell. The helmet 400 could even include an outer shell and several layers of shock wave attenuating material 110 alternating with high mass material layers. The high mass material could include, for example, a high density plastic, a composite, fiber glass, a para-aramid synthetic fiber composite, ultra high molecular weight polyethylene, enhanced polyethylene, expanded polypropylene, enhanced polystyrene, a vinyl, acrylonitrile butadiene styrene, an acrylic, a metal, or any other material typically used in a helmet. A shock-absorbing foam liner may also be added to the helmet.

Other sports protective equipment devices may also be used with embodiments of the present invention. Embodiments of the present invention may be stand-alone devices or may be coated onto other sports equipment. For example, a stand-alone liner may be created from layers of particles as described herein or the layers may be coated on one or more portions of an existing helmet. Other sports protective equipment may include, but is not limited to, helmets, liners, hats, eyewear to include goggles, gloves, faceguards, mouth guards, head guards, pads, jerseys, jock strap cups, wrist guards, shin guards, neck braces, ankle braces, ankle protectors, knee gaskets, upper body armor, kidney belts, padded shorts, arm and leg sleeves, shoes, boots, etc.

These composite materials can be further applied to fibers and used in connection with textiles. Textile applications can include textiles for use in firefighting, law enforcement, military, defense, sports, and fashion. Such cloth or film can be suitable for forming uniforms, helmets, helmet liners, helmet liner pads etc. that exhibit the beneficial effect of reacting to environmental changes in a predetermined manner. Specific examples can include inner liners for uniforms or jackets that can be attachable and/or fused into the cloth.

Sports impacts are a significant cause of injuries for athletic participants. Applicant believes the force of a sports impact behaves similarly to blasts and other impacts described in detail above. Therefore, embodiments of the present invention may be used to mitigate injuries caused by impacts. Textiles, pads, protective equipment, sporting equipment and other items may be coated for additional strength and impact protection during sporting activities. Textiles and protective gear may preferably use embodiments of the present invention to improve on existing impact protection for athletic participants. Examples of sports equipment that may use embodiments of the present invention may include, but are not limited to, helmets, liners, upper body armor, gloves, jerseys, pads for various body parts, jackets, pants, shorts, shirts, socks, shoes, hats, undergarments, swimwear, and wristbands. These types of articles may be coated according to embodiments of the present invention. This may allow for flexible materials with increase protection against sports impacts.

Additionally, various sporting equipment may be coated to provide additional strength and impact protection. Embodiments may be applied to one or more surfaces or portions of surfaces on sporting equipment. Examples of team sports equipment that may use embodiments of the present invention may include, but are not limited to, lacrosse shafts, lacrosse heads, lacrosse helmets, ice skates, roller skates, roller blades, hockey sticks, hockey helmets, hockey pucks, baseball helmets, baseball bats, ball gloves, batting gloves, catcher masks, catcher gear, field hockey sticks, cricket bats, football helmets, football face masks, shoulder pads and wrist guards, mouth guards, cleats, and shin guards. Examples of individual sports equipment that may use embodiments of the present invention may include, but are not limited to, bicycles, cycling helmets, cycling gloves, golf clubs, golf tees, tennis rackets, squash rackets, racquetball rackets, badminton rackets, skateboards, snowboards, skis, ski poles, bindings, ski and snowboard boots. Other examples may include, but are not limited to, riding crops, saddles, power sport helmets, bowling balls, billiard balls, billiard cues, gymnastics equipment, kayaks, canoes, boat hulls, snorkeling gear, scuba gear, fishing rods, fishing reels, fishing lures, paintball guns, airsoft guns, balls for various sports, shoes for various sports, sunglasses, exercise equipment, boxing gloves, and yoga mats. Exercise equipment such as treadmills and components of weight training machines and cross trainers can also use the shock absorbing qualities of the invention.

The articles themselves may be coated or may include a layer of coated materials within the articles. For example, in a protected jersey, a layer of coated fabric may be sandwiched between layers of traditional fabric or the traditional fabric may be coated according to embodiments of the present invention. Part of all of a piece of equipment may be used with embodiments of the present invention. For example, the head or the handle of a golf club may be coated, but the shaft may not be coated, or the handle of a baseball bat may be coated, or it can extend over the entire surface of the device.

The invention can also be employed in the area of medical devices for such things as neck braces and joint braces. Reduction in impact protection may prevent further injuries.

Figure 5:
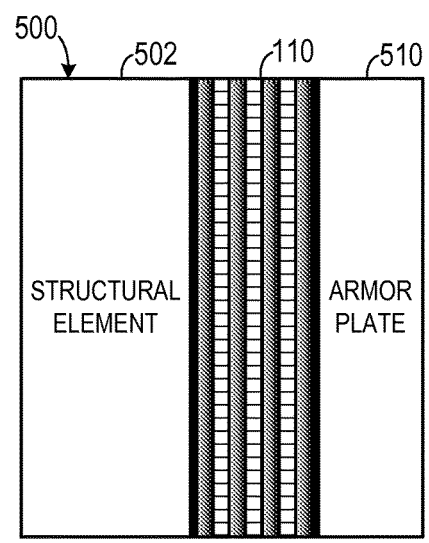
FIG. 5 is a schematic diagram of one embodiment of an armor unit.

As shown in FIG. 5, the shock wave attenuating material 110 can be part of an armor unit 500, which can include a structural element 502, such as a vehicle panel. An outer armor plate 510, such as a ceramic or composite plate, may provide an outer armor surface. The shock wave attenuating material 110 may be disposed between the structural element 502 and the armor plate 510. The shock wave attenuating material 110 could also be outside of either the structural element 502 or the armor plate 510 or both. It will be appreciated that any combination of these configurations will fall within the scope of the invention.

Figure 6:
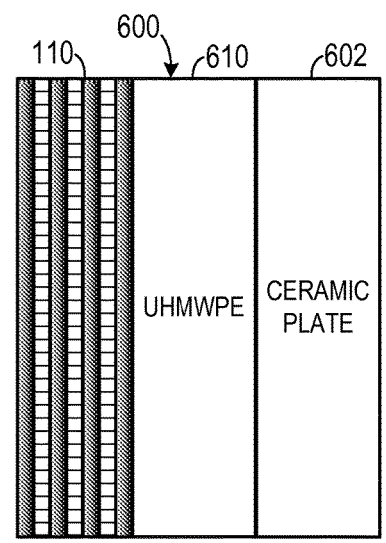
FIG. 6 is a schematic diagram of one embodiment of a body armor unit.
Figure 7:
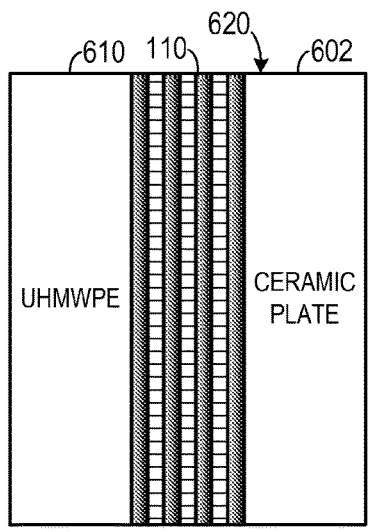
FIG. 7 is a schematic diagram of one embodiment of a body armor unit.
Figure 8:
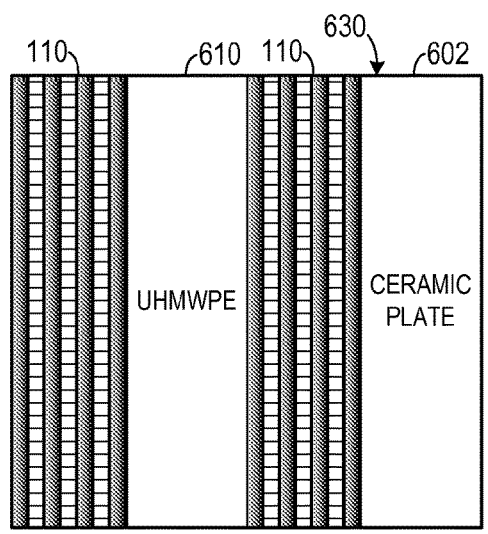
FIG. 8 is a schematic diagram of one embodiment of a body armor unit.

As shown in FIG. 6, one embodiment of a body armor assemblage 600, such as an interceptor body armor assemblage (of the type used in the Improved Outer Tactical Vest, Improved Modular Tactical Vest and the US Army and USMC plate carriers). Such an assemblage 600 may include an armor plate 602 (such as a ceramic plate) with a high mass member. Examples of materials suitable for use in the high mass member may include: a high density polymer 610 (such as an ultra-high molecular weight polyethylene), a para-aramid synthetic fiber composite, a carbon fiber composite, a metal, a ceramic and combinations thereof. The shock wave attenuating material 110 can be applied to the high density polymer 610 on the high density polymer 610 opposite from the armor plate 602 on the side adjacent to the body of the user. As shown in FIG. 7, in one embodiment of a personal body armor assemblage 620, the shock wave attenuating material 110 is disposed between the high density polymer 610 and the armor plate 602. As shown in FIG. 8, multiple layers of shock wave attenuating material 110 may be applied to the armor assemblage 630. Any of these applications may help solve the problem of backface deformation.

In one application, the shock wave attenuating material 110 can be applied to such devices as soccer shin guards, baseball catchers' chest pads, football shoulder pads, baseball mitts and the like. In can also be applied to such devices as golf clubs and baseball bats to reduce the effects of shock associated with their use.

In some embodiments, the gradient nanoparticle composite material is capable of absorbing an impact of a shock wave that, for example, is produced by an explosion or caused during operation of a device. In some embodiments, the gradient nanoparticle composite material is capable of mitigating and/or remediating one or more secondary blast effects resulting from the explosion.

In some embodiments, the gradient nanoparticle composite material is capable of reacting to and/or interacting with one or more stimuli existing in a blast zone environment. For example, in some embodiments the material can absorb at least a portion of an initial blast impact and/or the over pressure wave resulting from an explosion. In addition, or alternatively, the gradient nanoparticle composite material can be designed to mitigate and/or remediate one or more related blast effects resulting from the blast impact itself. Thus, some embodiments can provide a composite material that through intelligent design of the system can not only reduce blast impact with greater efficiency and efficacy, but that can also mitigate and/or remediate one or more secondary blast effects.

In another aspect, embodiments of the present invention may be a casing for a handheld device, a laptop computer, an audio device, an e-book, a computer, a television, an mp3 player, a portable DVD player, and/or a device that may include at least one structural element, and a plurality of shock attenuating layers. The plurality of shock attenuating layers may be disposed in a predetermined relationship with at least one structural element. The shock wave attenuating material may include a substrate layer and a plurality of shock attenuating layers may be disposed on the substrate layer. The substrate layer may include a surface of the device. Each of the plurality of shock attenuating layers may include a gradient nanoparticle layer including a plurality of nanoparticles of different diameters that are arranged in a gradient array, e.g., a structure tapered in multiple directions, from smallest diameter to largest diameter and at least one carbon allotrope layer disposed adjacent to at least one gradient nanoparticle layer. The carbon allotrope layer may include a plurality of carbon allotrope members, e.g. graphene, carbon nanotubes, fullerenes, etc., suspended in a matrix.

In another aspect, embodiments of the present invention may be a screen, a touch screen, either analog, matrix or other type and/or a screen protector for a screen, for a handheld device, a laptop computer, an audio device, an e-book, a computer, a television and/or a device, made transparent by a predetermined selection of nanoparticles, by size and/or material, e.g., silica. Screens may be transparent, translucent and/or opaque over one or more portions of the screen. The shock wave attenuating material may include a substrate layer and a plurality of shock attenuating layers may be disposed on the substrate layer. The substrate layer may include a surface of a device. Each of the plurality of shock attenuating layers may include a gradient nanoparticle layer including a plurality of nanoparticles of different diameters that are arranged in a gradient array, e.g., a structure tapered in multiple directions, from smallest diameter to largest diameter and may include a carbon allotrope layer disposed adjacent to at least one gradient nanoparticle layer. The carbon allotrope layer may include a plurality of carbon allotrope members, e.g., graphene, carbon nanotubes, fullerenes, etc., suspended in a matrix.

Figure 18:
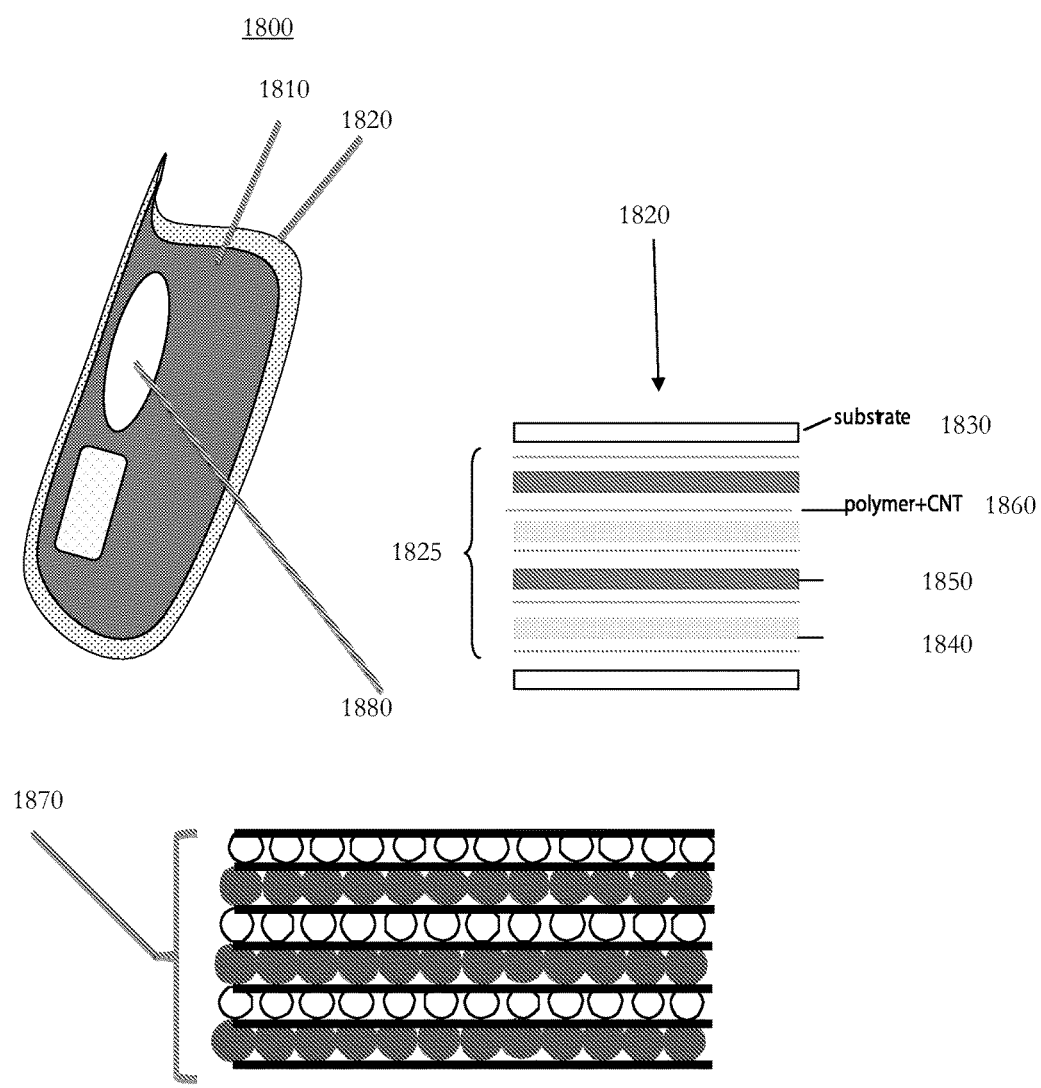
FIG. 18 is a schematic diagram of one embodiment of a radio frequency shielding embodiment.

FIG. 18 shows an exemplary handheld device 1800. A component of the handheld device 1800 may be a high mass member 1810, e.g. a plastic, a metal, e.g., anodized aluminum, or a glass to provide a structural element onto which a shock wave attenuating material 1820 may be applied. The shock wave attenuating material 1820 may include a substrate 1830, and a gradient nanoparticle layer 1825. The gradient nanoparticle layer 1825 may include a plurality of nanoparticles of different diameters that are arranged in a gradient array, i.e., a structure tapered in multiple directions, from smallest diameter 1840, to largest diameter 1850, and at least one carbon allotrope layer 1860, which may be disposed adjacent to at least one gradient nanoparticle layer. The carbon allotrope layer 1860 may include a plurality of carbon allotrope members suspended in a matrix. This iteration involves at least one "stack" or "layer" of such a structure with at least one carbon allotrope layer, e.g., graphene, nanotubes, fullerenes, defining the stack or layer limit. This "stack" or "layer" of such a structure with one or more carbon allotrope layers may be repeated 1870 to achieve the maximum residual force desired. Note that in the following examples, particles sizes are given as ranges, however, in certain preferred embodiments particle sizes will be approximately the same size within the range. For example, in one layer, the particles will be approximately 320 nm. In various embodiments, layers of particles may be monolayers or multilayers. In one embodiment, the stack may include a carbon allotrope layer, a layer of particles approximately 160 nm to approximately 320 nm in diameter, a carbon allotrope layer, and a layer of particles approximately 200 nm to approximately 400 nm in diameter. This may be repeated, e.g., one or more times, such as five times. In an alternative embodiment, the stack may include a carbon allotrope layer, then approximately five pairs of a layer of particles approximately 160 nm to approximately 320 nm in diameter and a layer of particles approximately 200 nm to approximately 400 nm diameter. This may be repeated, e.g., one or more times.

As shown in FIG. 18, a handheld device 1800 may have a screen 1880 made of, e.g., a glass, that may provide a structural element onto which the shock wave attenuating material may be applied. Two potential substrates may be polycarbonate and carbon fiber composites/laminates. The gradient nanoparticle layer may include a plurality of nanoparticles of different diameters, made of, e.g., silica, that are arranged in a gradient array and may include at least one carbon or carbon composites, or polymer-carbon allotrope layer, 1860, which is disposed adjacent to at least one gradient nanoparticle layer. A silica nanoparticle may preferably have a diameter up to approximately 220 nm.

In certain other iterations, an exemplary system may involve at least one "stack" or "layer" of such a structure with at least one carbon or carbon composites or carbon allotrope layer defining the stack or layer limit. This "stack" or "layer" of such structures may be repeated, to achieve the maximum residual force desired, e.g., substrate, a layer of particles approximately 110 nm in diameter, a layer of particles approximately 130 nm in diameter, a layer of particles approximately 160 in diameter, a layer of particles approximately 200 nm in diameter, a layer of particles approximately 220 nm in diameter, a layer of particles approximately 200 nm in diameter, a layer of particles approximately 160 nm in diameter, a layer of particles approximately 130 nm in diameter, a layer of particles approximately 110 nm in diameter, repeated, e.g., one or more times, and a carbon allotrope layer, which may include a plurality of carbon allotrope members suspended in a matrix.

In another aspect, embodiments of the present invention may provide radio frequency [RF] shielding to reduce and/or redirect the transmission of electric and magnetic fields. This embodiment may be part of a cladding for a power line, a signal line, or a pipe, may be part of casing or cowling, for a handheld device, a laptop computer, an audio device, an e-book, a computer, a television, electronic equipment, and/or a device that may include at least one structural element, and a plurality of shock attenuating layers, which may be disposed on a substrate layer. Each of the plurality of shock attenuating layers may include a gradient nanoparticle layer including a plurality of nanoparticles of different diameters that are arranged in a gradient array, which includes at least one of solid, hollow, or core shell particles, either filled, unfilled, or both, which include, at least in part, a metal with high conductivity, e.g., copper, nickel, an alloy with high permeability, e.g., nickel-iron, aluminum. A carbon allotrope layer, e.g., carbon or carbon composites or polymer-carbon allotrope layer, e.g., graphene, nanotubes, fullerenes, may be included and disposed adjacent to at least one gradient nanoparticle layer. The carbon allotrope layer may include a plurality of carbon allotrope members, e.g. graphene, nanotubes, fullerenes, suspended in a matrix. Each of the plurality of shock attenuating layers may include a gradient nanoparticle layer and at least one carbon allotrope layer disposed adjacent to at least one gradient nanoparticle layer.

Figure 19:
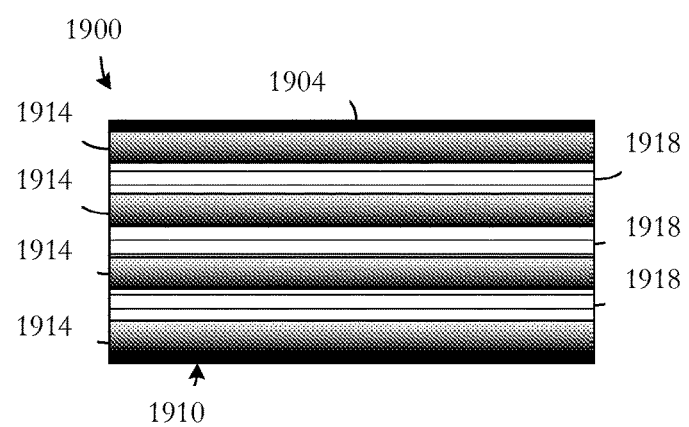
FIG. 19 is a schematic diagram of one embodiment of a shock wave attenuating material of FIG. 18.

As shown in FIG. 19, one embodiment of a shock wave attenuating material 1900 may include a substrate layer 1904 and a plurality 1910 of shock attenuating layers disposed on the substrate layer 1904. Each of the plurality 1910 of shock attenuating layers may include a gradient nanoparticle layer 1914 with particles at least one of solid, hollow, core shell, either filled, unfilled, or both, which may include, at least in part, a metal with high conductivity, e.g., copper, nickel, an alloy with high permeability, e.g., nickel-iron, aluminum. The shock attenuating layers may also include a carbon allotrope layer 1918 disposed adjacent to at least one gradient nanoparticle layer 1914. In a typical embodiment, the shock wave attenuating material 1900 may include at least 3 gradient nanoparticle layers 1914 with at least 3 carbon allotrope layers 1918 (only three are shown for the purpose of this illustration).

In other embodiments of the present invention, the carbon allotrope layers 1918 may be sufficiently remote from the gradient nanoparticle layers 1914 so as to not be adjacent. For example, one or more layers of materials may be located between the gradient nanoparticle layers 1914 and the carbon allotrope layers 1918, which include one of solid, hollow, core shell particles, either filled, unfilled, or both. The layers of other materials may include coatings and/or non-gradient nanoparticle layers. Any additional gradient nanoparticle layers may be the same or different than the gradient nanoparticle layers.

Figure 20:
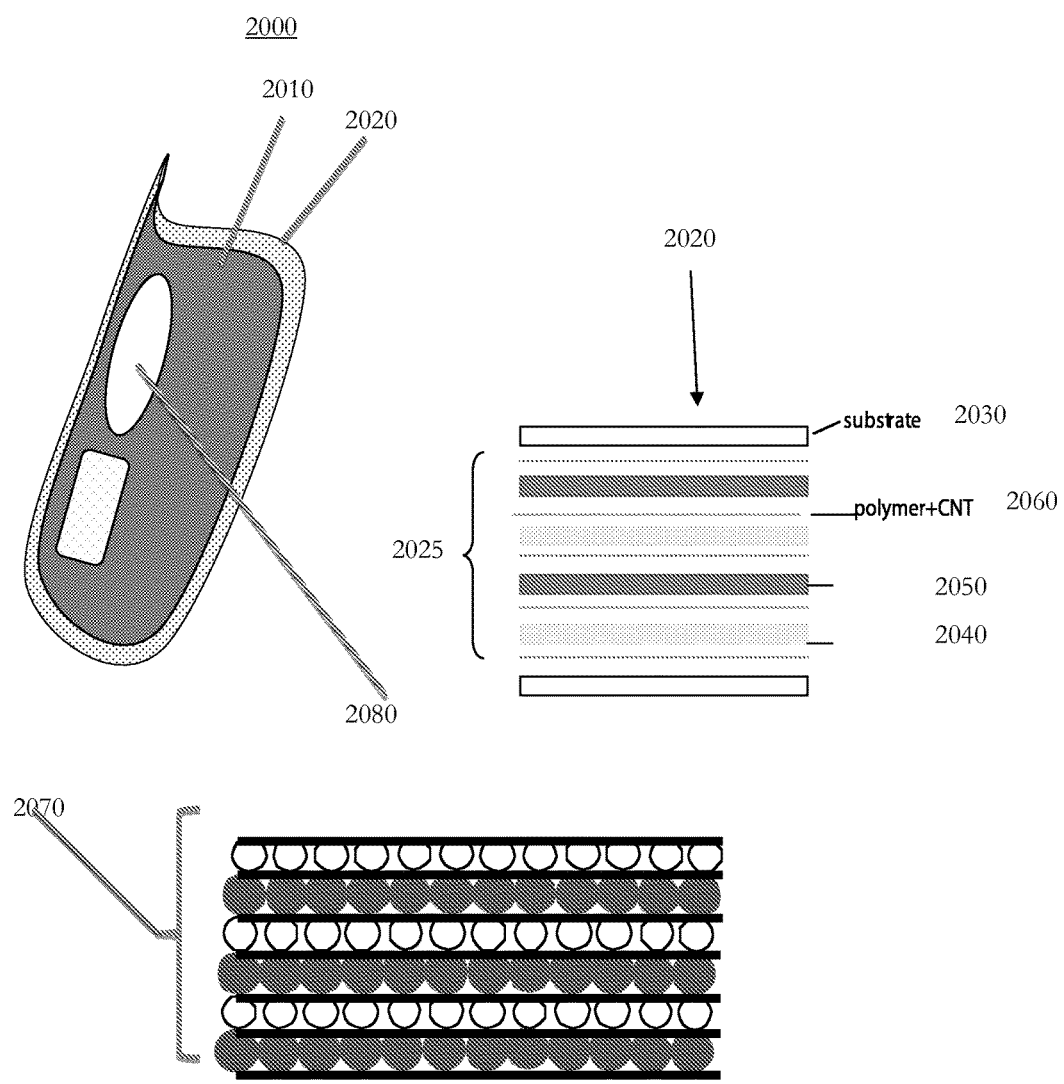
FIG. 20 is a schematic diagram of one embodiment of a cell phone embodiment.

As shown in FIG. 20, a handheld device 2000 may be provided. A high mass member 2010 may be a component of the handheld device 2000, where the high mass member 2010 may be, e.g. a plastic, or a metal, e.g., anodized aluminum, or a glass, for providing a structural element onto which a shock wave attenuating material 2020 may be applied. The shock wave attenuating material may include a substrate 2030 and one or more gradient nanoparticle layers 2025. The one or more gradient nanoparticle layers 2025 may include a plurality of nanoparticles of different diameters arranged in a gradient array, e.g., a structure tapered in multiple directions, from smallest diameter 2040 to largest diameter 2050. Particles may be at least one of solid, hollow, core shell, either filled or unfilled or both, and may include a metal with high conductivity, e.g., copper, nickel, an alloy with high permeability, e.g., nickel-iron, aluminum. A radio frequency shielding particle layer may include these radio frequency shielding particles. These radio shielding particles may make up a portion, a majority, nearly all or all of the particles in the radio frequency shielding particle layer. At least one carbon allotrope layer 2060 may be disposed adjacent to at least one gradient nanoparticle layer. The carbon allotrope layer 2060 may include a plurality of carbon allotrope members, e.g., graphene, nanotubes, fullerenes, suspended in a matrix. As shown in FIG. 20, a handheld device 2000 may have a screen 2080 made of, e.g., a glass, that may provide a structural element onto which the shock wave attenuating material may be applied.

In certain other iterations, an exemplary system may involve at least one "stack" or "layer" of such a structure with at least one carbon allotrope layer defining the stack or layer limit. In one embodiment, a "stack" or "layer" of such a structure with allotrope layer, may be repeated 2070 to achieve the maximum residual force desired, e.g., a carbon allotrope layer, a layer of radio frequency shielding particles approximately 5 nm to approximately 500 nm in diameter, a carbon allotrope layer, a layer of particles approximately 160 nm to approximately 320 nm in diameter, a carbon allotrope layer, a layer of particles approximately 200 nm to approximately 400 nm in diameter, repeated, e.g. one or more times, such as preferably five times.

Alternatively, a "stack" or "layer" may include a carbon allotrope layer, a layer of radio frequency shielding particles approximately 5 nm to approximately 500 nm in diameter, then approximately five pairs of a layer of particles approximately 160 nm to approximately 320 nm in diameter and a layer of particles approximately 200 nm to approximately 400 nm in diameter, repeated, e.g., one or more times. The radio frequency shielding particles may be copper particles.

The following are exemplary systems according to the present invention. They are illustrative and not intended to limit the scope of the present invention.

Example 1

An embodiment of the present invention may include:
substrate,
carbon allotrope layer, which may include a plurality of carbon allotrope members suspended in a matrix,
a layer of particles approximately 110 nm in diameter,
a layer of particles approximately 130 nm in diameter,
a layer of particles approximately 160 nm in diameter,
a radio frequency shielding layer of particles approximately 5 nm to approximately 500 nm in diameter, such as copper, nickel, or other highly conductive metal or alloy particle layer,
a layer of particles approximately 220 nm in diameter,
a layer of particles approximately 200 nm in diameter,
a layer of particles approximately 160 nm in diameter,
a layer of particles approximately 130 nm in diameter, and
a layer of particles approximately 110 nm in diameter.
The layers described above may be repeated one or more times.

Example 2

An embodiment of the present invention may include:
a substrate,
carbon allotrope layer, which may include a plurality of carbon allotrope members suspended in a matrix,
a radio frequency shielding layer of particles approximately 5 nm to 500 nm in diameter, such as copper, nickel, or other highly conductive metal,
a layer of particles approximately 110 nm in diameter,
a layer of particles approximately 130 nm in diameter,
a layer of particles approximately 160 nm in diameter,
a layer of particles approximately 200 nm in diameter,
a layer of particles approximately 220 nm in diameter,
a layer of particles approximately 200 nm in diameter,
a layer of particles approximately 160 nm in diameter,
a layer of particles approximately 130 nm in diameter, and
a layer of particles approximately 110 nm in diameter.
The layers described above may be repeated one or more times.

Example 3

An embodiment of the present invention may include:
a substrate,
a carbon allotrope layer, which may include a plurality of carbon allotrope members suspended in a matrix,
a radio frequency shielding layer of particles approximately 5 nm to 500 nm in diameter, such as copper, nickel, or other highly conductive metal, or alloy,
a layer of particles approximately 160 nm to approximately 320 nm in diameter, and
a layer of particles approximately 200 nm to approximately 400 nm in diameter.
The layers described above may be repeated one or more times.

Example 4

An embodiment of the present invention may include:
a substrate,
a carbon allotrope layer, which may include a plurality of carbon allotrope members suspended in a matrix,
a radio frequency shielding layer of particles approximately 5 nm to approximately 500 nm in diameter, such as copper, nickel or other highly conductive metal or alloy,
a layer of particles approximately 160 nm to approximately 320 nm in diameter,
a layer of particles approximately 200 nm to approximately 400 nm in diameter,
a layer of particles approximately 160 nm to approximately 320 nm in diameter,
a radio frequency shielding layer of particles approximately 5 nm to approximately 500 nm in diameter, such as copper, nickel or other highly conductive metal or alloy,
a layer of particles approximately 160 nm to approximately 320 nm in diameter,
a layer of particles approximately 200 nm to approximately 400 nm in diameter,
a radio frequency shielding layer of particles approximately 5 nm to approximately 500 nm in diameter, such as copper, nickel or other highly conductive metal or alloy, and
a layer of particles approximately 160 nm to approximately 320 nm in diameter,
a layer of particles approximately 200 nm to approximately 400 nm in diameter.
The layers described above may be repeated one or more times.

In some embodiments, the gradient nanoparticle composite material can provide bomb blast mitigation and/or remediation by reducing the reflective value of the bomb blast by absorption of the bomb blast energy. In some embodiments, the primary mitigating and/or remediating process can be by absorption of the bomb blast shock wave. In some embodiments, the mitigating and/or remediating process can be by absorption of the pre-over pressure wave that precedes the shock wave. Absorption of the shock wave and/or the pre-over pressure wave can occur through one or more mechanisms, including, for example, momentum transfer, destruction of the spatial symmetry of, e.g., the blast wave, plastic deformation, rupture of particles, e.g., filled and unfilled core-shell particles, restitution, and interparticle/interlayer shear.

In some embodiments, the gradient nanoparticle composite material can provide a platform from which a wide variety of blast effects can be mitigated and/or remediated. For example, in a filled-shell material the absorbed energy can be utilized to rupture microcapsules, for example, to introduce a series or selection of materials or material systems into the blast environment and to thus mitigate and/or remediate the blast effects. This rupture could alert the user that some of the effectiveness of the invention has been reduced and to alert the user to unobserved shock waves. In some embodiments, the gradient nanoparticle composite material can provide a relatively light weight material that can be applied to preexisting structures or systems with no deleterious effects on the performance attributes of the pre-existing structure or system.

Some embodiments provide bomb proofing, impact or smart material applications. Examples of bomb proof applications include receptacles and liners (such as in waste receptacles and bags, etc.), satellites, helicopters, and high tech devices (computer/hardware casings, cable protection), construction (buildings and their facades), bridges and their structural members, pipes and pipelines (for fossil fuels, conduits, utilities), automotive (door panels, bumpers, dashboards, windshields and windows, undercarriages and roofs), aerospace (interior/exterior of planes), etc. In some embodiments, the gradient nanoparticle composite material can be used in connection with military equipment, structures, vehicles, vessels and crafts for land, sea, and airborne forces to include armored and unarmored vehicles, aircraft, (which includes helicopters and unmanned drones), and nautical vessels such as submarines, ships, boats and the like.

For military and civilian uses, the gradient nanoparticle composite material can be applied as an exterior coating, film, intermediate layer and/or as a panel to pre-existing equipment or, alternatively, can be utilized for forming structural components of the military vehicle, aircraft, or nautical vessel.

The application of gradient nanostructured composites for the attenuation of shock waves is based on the same principles that apply macroscopic granular spheres to create blast walls. Granular materials, especially arranged in a gradient, create mismatching of the solitary wave at each particle contact point and, hence, attenuation of that wave. The effect is a combination of passive and active physical processes: absorption, distortion, and engineered redirection of the shock wave without appreciable heating. In effect, the composite causes destructive interference of the shock wave to attenuate the incident wave. The composite, an ordered structure including selected solid, hollow and filled nanoparticles, may be coated onto at least a portion of a surface (e.g., a protective device, such as a helmet) and may also be produced as a self-supported liner (using plastic containment). Additionally, while the gradient array provides shock attenuation, the material within the filled nanoparticles acts to create an indicator that the user has experienced a shock wave sufficient to cause mild or severe traumatic brain injury while wearing the protective device, such as a helmet. The final product is a lightweight coating that does not change the flexibility of the treated material and which can be made transparent by careful choice of nanoparticle materials. After activation, the protective device may be recoated, if that technology was used in production, or the liner may be replaced, if that approach was employed.

One-dimensional models of a shock wave propagating through a homogeneous or a tapered granular chain demonstrate shock wave attenuation. While three-dimensional structures are too complex for existing modeling systems, the major properties observed for one dimensional calculations are valid in the three-dimensional case. Assuming no elastic effects and no loading, the spheres are simply touching at a single point of contact, the kinetic energy loss is calculated as a function of the change in sphere radius, q, as a wave travels through the spheres, the energy lost per collision in the spheres, EL, and the number of spheres, N, in the chain:

$$\frac{KE_{OUT}}{KE_{IN}} = \left\{ \frac{[2(1-q)^3 - E_L]^2}{(1-q)^3[1+(1-q)^3]^2} \right\}^{N-1} \quad (1)$$

The values of q and N are fixed by the experiment; the loss term is defined by the ratio of the loading force as two particles come together under the influence of a wave and the unloading forces, as they separate. The decrease in kinetic energy predicted by Equation (1), $KE_{OUT}/KE_{IN}$, is independent of the size of the spheres. The decrease in kinetic energy occurs because each particle absorbs some of the incident energy and that energy remains with the particle. Note that for small values of N, a chain of constant size (q=0) exhibits little loss of kinetic energy. For values of q of the order of 10% and elastic losses of approximately 5%, as much as 80% of the input energy may be absorbed in a chain of 20 spheres. Experimental evidence confirms the theoretical prediction. The large number of nanoparticles in a typical coating provides a large number of the particle to particle contact points required by Equation (1) and also serves to dissipate the kinetic energy surrendered by the incident shock wave without appreciable heating of the coating.

Figure 11:
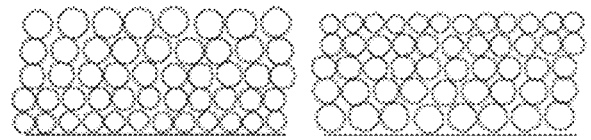
FIG. 11 is a schematic diagram of tapered nanoparticle gradients with (a) decreasing nanosphere radius and (b) increasing nanosphere radius.

Experimental evidence and theory indicate that the concept and its shock attenuation benefit are independent of particle size. That fact opens the door to using the principles to design nanostructures with a tapered chain-like structure. Such a structure is inherently three-dimensional and beyond the current theoretical models. Careful consideration, however, indicates that it is best described as a gradient array of nanoparticles; a structure tapered in multiple directions and offering increased attenuation of incoming shock waves. The structure could be built from monolayers of nanoparticles deposited on a substrate beginning with the smallest radius and growing larger with a q of approximately 10% (FIG. 11a), the nanoparticle layer gradient could be reversed (FIG. 11b), either gradient could be repeated in order or alternating gradients that reverse the order of the nanoparticle layers could be constructed or monolayers of each particle size could be used to construct the gradient. Moreover, chemically modified nanoparticles present the opportunity to add functionality to the nanostructure. The nanospheres may be solid and made of any number of polymers, metals, ceramics or other materials, so that the elastic properties and the interparticle forces may be varied. Hollow nanoparticles offer an interesting capability to insert voids, spheres shattered under compression by the shock wave, which would only act when the particles are compressed by sufficient force. Polymer nanoparticle shells may be constructed to carry other materials within the nanoparticle, providing the means to include in the structure indicators of the passage of a blast wave or the ability to release a beneficial agent to the users upon activation by the blast wave. The final product is a lightweight coating that does not change the flexibility of the treated material and can be made transparent by careful choice of nanoparticle materials. Taken as a whole, these characteristics of nanostructured gradient arrays provide a menu for the development of blast wave protection with targeted applications.

One version involves a structure that incorporates carbon allotrope (fullerene, nanotubes or graphene) and/or carbon allotrope-polymer composite layers into the overall structure. The carbon allotropes provide increased strength to the nanostructure since these materials rank among the strongest known. One embodiment may employ "stacks" or "layers" of such structures with the carbon and/or carbon composites interspersed and defining the layer or stack limit. The effect, at each carbon interface, is to create a backward traveling wave causing attenuation of the incident shock wave, as well as a greatly reduced forward transmitted shock wave, which passes in to the next layer of the structure. Each pair of carbon layers defines a subgradient with its own "walls". A stack of 50 gradient nanoparticle structures (each composed of 30 nanoparticle layers) and composite layers may result in a 1 mm thick coating and significant attenuation of the incident shock wave. This structure would have a thickness of approximately 100 μm or 10 human hairs.

In one experimental embodiment, samples were made using a spin coating technique and measuring approximately 6 cm². Samples having a wide variety of gradients and employed solid polymer, solid silica, hollow polymer and filled (with long-chain hydrocarbons, as prototypes) silica nanoparticles were employed. Mono-dispersed coatings, tapered gradients (large to small and small to large) and repetitive gradients using polycarbonate substrates treated with UV light to make the surface polar or Rinzl plastic substrates (polyvinylchloride) were also used. Most samples employed a hexagonal close packed of the nanoparticles. The coatings typically had a tapered gradient of 320 nm/260 nm/220 nm/160 nm/130 nm. The maximum in the impact shock wave was reduced in magnitude and delayed relative to initiation of the event. The reduced force was also spread over a greater temporal region to minimize the net effect. A list of some of our results is contained in the table below, along with brief descriptions of the nanosphere gradients.

Figure 12:
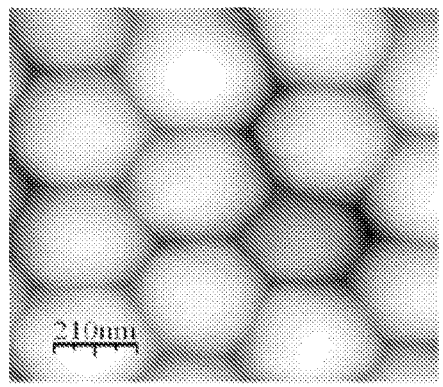
FIG. 12 is an atomic force microscopy (AFM) image of 320 nm polystyrene coating on polycarbonate.
Figure 13:
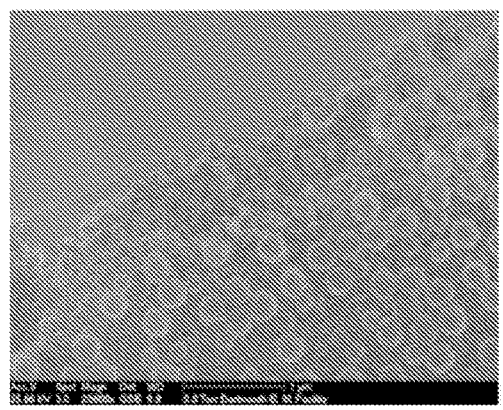
FIG. 13 is a scanning electron microscopy (SEM) cross section of a multi-layer gradient ranging from 320 nm to 130 nm.
Figure 15:
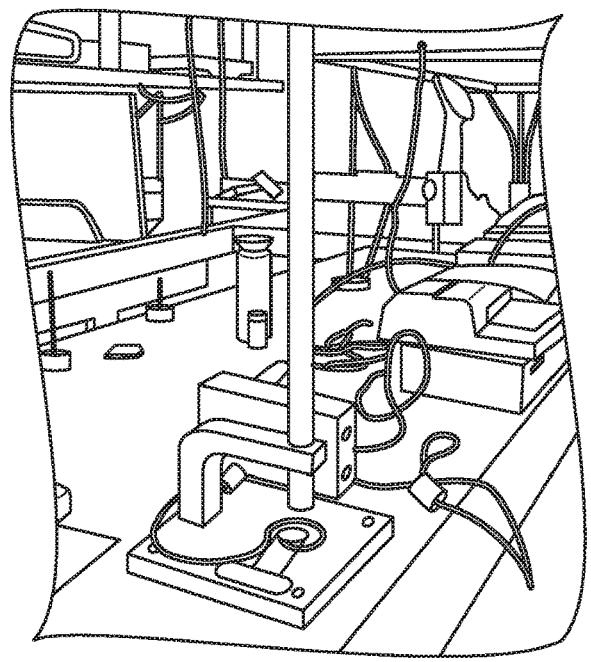
FIG. 15 is an exemplary impact tester according to one embodiment.

The nanoparticle gradients were sandwiched between two polycarbonate layers. Some examples are shown here by means of atomic force microscopy in FIG. 12 (a monodispersed 320 nm coating) and via environmental scanning electron microscopy in FIG. 13 (a monolayer-built gradient coating). In FIG. 12, the hexagonal close packed nature of the film is evident, especially at the site of the missing nanosphere. The gradient and monolayer nature of the coating in FIG. 13 can be clearly seen. Laboratory samples were tested using a custom-built impact tester, the device is shown in FIG. 15, to explore the effects of the nanostructures on the shock wave caused by the impact of a falling mass.

Figure 14:
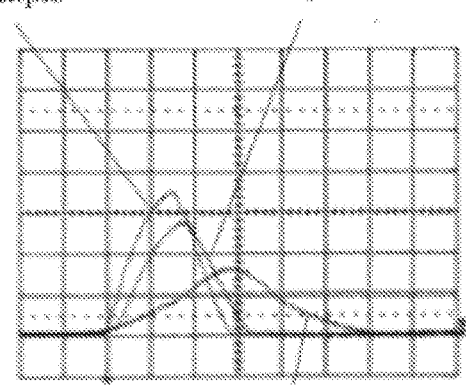
FIG. 14 is a graph showing a shock attenuation effect from a 15-layer (three different radii) nanostructure of polystyrene spheres.

A set of typical attenuation results is shown in FIG. 14, where the influence of the 15-layered nanostructure is clearly visible. The maximum in the impact shock wave is reduced in magnitude, delayed relative to initiation of the event and spread over a greater time frame. The reduced force is also spread over a greater temporal region to minimize the net effect.

The following table (Table 1) shows experimental impact shock results for polystyrene or silica nanospheres between two treated polycarbonate plates. The nanoparticles were solid spheres, except the 400 nm size, which were hollow:

TABLE 1

| Sample | Max. Force, N | Width, ms | Delay, ms | Comments |
| --- | --- | --- | --- | --- |
| Bare sensor | 1334 | 0.16 | — | Control-no sample at all |
| Polycarbonate x2 | 1156 | 0.27 | 0.10 | Control-two polycarbonate substrates |
| #1 | 872 | 0.31 | 0.18 | 130-160-220-260: 8 repeats/4 layers |
| #3 | 783 | 0.30 | 0.21 | 130-160-220-260-220-160: 5 repeats/6 layers |
| #5 | 623 | 0.34 | 0.22 | 130-160-220-260-320-400-320-260-220-160: 3 repeats/10 layers |
| #7 | 712 | 0.31 | 0.20 | 150-150-150 (silica): 30 repeats/1 layer |
| #8 | 578 | 0.34 | 0.24 | 320-400: 13 repeats/2 layers |
| #10 | 712 | 0.30 | 0.21 | 400-320-260-220-160-130: 4 repeats/6 layers |

The tests described hereinafter were performed on the 2.5 cm×2.5 cm samples produced between two polycarbonate plates of the same area and 3 mm thickness. A 0.25 kg weight with a 13 mm striking surface was dropped onto the samples from heights that varied between 25 mm and 75 mm, producing impact energies of 0.2 J to 0.6 J. Alternatively, a ¼ lb. weight was dropped from 13.5 mm, producing an impact energy of 0.05 J. The transmitted force is detected by a dynamic force sensor located below the sample. This laboratory test is analogous to the test applied to military helmets (BS EN 397; 1995), which uses maximum residual force as the measuring metric.

Six different sample types were produced including variants of the gradient order, the nanoparticle material and the physical properties of the nanoparticles. The samples, all of approximately 6 μm total nanoparticle thickness, are first described in Table 2, with the results, compared with a control sample of two polycarbonate plates, are presented in Table 3. Table 3 presents both the maximum residual force and the integrated force reaching the sensor below the sample.

TABLE 2

Sample definitions for the gradient experiments. Particles are acid functionalized polystyrene unless otherwise noted. All 400 nm nanoparticles are hollow.

| Sample | Description, nanoparticle size in nm |
| --- | --- |
| 96-A | 8 Repeats: 130/160/220/260// Discontinuous gradient; begins repeat with 130 |
| 96-B | 5 Repeats: 130/160/220/260/320/320/260/220/160// Continuous gradient; begins repeat with 130 |
| 96-C | 3Repeats: 130/160/220/260/320/400/320/260/220/160// Continuous gradient; begins repeat with 130 |
| 96-D | 30 Repeats: 150 nm silica nanoparticles Single (small) particle size coating |
| 96-E | 13 Repeats: 320/400// Double (large) particle size coating; hollow nanoparticles |
| 96-F | 4 Repeats: 400/320/260/220/260/130// Discontinuous gradient; large nanoparticles near surface |

TABLE 3

Impact testing results[a] for the samples[b] described in Table 2.

| Sample | $F_{res}$, N | % Res vs. Control | $Area_{res}$, N · ms | % Res vs. Control |
|---|---|---|---|---|
| 96-A | 872 | 75 | 275 | 75 |
| 96-B | 783 | 68 | 279 | 76 |
| 96-C | 623 | 54 | 220 | 60 |
| 96-D | 712 | 62 | 265 | 72 |
| 96-E | 578 | 50 | 204 | 56 |
| 96-F | 712 | 62 | 249 | 68 |

[a]Definitions: $F_{res}$ = maximum force detected by sensor below the sample (See BS EN 397)
$Area_{res}$ = total area of the force vs. time curve at the sensor
[b]Control sample (polycarbonate) shows $F_{res}$ = 1156N and $Area_{res}$ = 367N · ms Experiments with the most effective gradients in Table 2 examined the performance as a function of the number of complete gradients applied to the polycarbonate. The selected samples were 96-C, 96-E and 96-F. The number of complete gradients is indicated in Table 4 with the results shown in Table 5.

TABLE 4

Sample definitions for the thickness study experiments. The letter designations and nanoparticles are defined in Table 2 and the final number refers to the total number of gradients.

| Sample | Description, nanoparticle size in nm |
|---|---|
| 105-C-1 | 1 Repeat: 130/160/220/260/320/400/320/260/220/160/130 |
| 105-C-2 | 2 Repeats: 130/160/220/260/320/400/320/260/220/160// |
| 105-C-3 | 3 Repeats: 130/160/220/260/320/400/320/260/220/160// |
| 105-E-5 | 5 Repeats: 320/400// |
| 105-E-10 | 10 Repeats: 320/400// |
| 105-E-13 | 13 Repeats: 400/320// |
| 105-F-2 | 2 Repeats: 400/320/260/220/260/130// |
| 105-F-3 | 3 Repeats: 400/320/260/220/260/130// |
| 105-F-5 | 5 Repeats: 400/320/260/220/260/130// |

The results in Table 3 provide evidence of the predicted attenuation of the residual force with attenuation of up to 50% for a small number of gradient layers. The effect of increasing the thickness, the addition of a larger number of gradients, is to further decrease the residual force as shown by the results in Table 5. In summary, the results indicate that the decision point is the desired residual force. Once a value is selected, the coating may be designed with the proper gradient and the proper number of gradient layers to reach that attenuation point, in agreement with the theoretical prediction of Equation 1.

TABLE 5

Impact testing results for the samples described in Table 4.

| Sample | $F_{res}$, N | % Res vs. Control |
|---|---|---|
| 105-C-1 | 700 | 62 |
| 105-C-2 | 508 | 45 |
| 105-C-3 | 452 | 40 |
| 105-E-5 | 868 | 77 |
| 105-E-10 | 770 | 69 |
| 105-E-13 | 578 | 51 |
| 105-F-2 | 794 | 71 |
| 105-F-3 | 674 | 60 |
| 105-F-5 | 656 | 58 |

[a] Control sample (polycarbonate) shows $F_{res}$ = 1124N.

While a thicker sample performs better, the enhancement is slow. The increase in gradient numbers is most profound for the continuous gradient that includes the hollow nanospheres. The dual sized gradient shows improvement with increasing thickness as well, but not as rapidly as the gradient.

An experiment was conducted in which the polystyrene nanoparticle coatings were combined with coatings of carbon nanoparticles. Either a continuous gradient, as in sample 96-B described above, or a two nanoparticle gradient, as in sample 96-E above, was applied five times with application of carbon nanoparticles, C60, carbon nanotubes or graphene, after each complete continuous gradient or five repetitions of the 320 nm/400 nm gradient. Control samples of only six layers of the graphene and carbon nanotube nanoparticles were also constructed. The control carbon nanotube sample showed no statistical reduction of the residual force over the polycarbonate control, while the graphene sample showed approximately 10% reduction over the uncoated polycarbonate.

The continuous gradient samples with the added carbon nanoparticles yielded a 15% reduction over the carbon nanoparticle only control samples. The 320 nm/400 nm samples that included carbon nanoparticles generally provided the same result as those with the continuous gradient with the exception of the graphene sample that yielded a 32% reduction in comparison to the carbon nanoparticle only control. The carbon nanoparticle layers were all delivered from ethanol suspensions. Ethanol, mixed with an aqueous buffer, is also the solvent of choice for the polystyrene nanoparticles that make up the gradient.

The overall guiding concept is to intersperse the polystyrene nanosphere gradient component layers with polymer layers, "sealing" the active layer before depositing the next layer of the gradient. The two studies were conducted which involved the most active gradients from the earlier studies, 96-C and 96-E. In one case, ten layers of the pair 320 nm/400 nm were applied with a polymer+carbon nanotube composite after every nanosphere application on polycarbonate substrates. In the second, the continuous gradient, 130/160/190/270/320/270/190/160/130, was applied, again with the polymer+carbon nanotube composite after every nanosphere application. Only a single gradient was produced on Rinzl (polyvinylchloride) substrates, but ten identical samples were produced.

The 320/400 samples were first tested using our standard impact apparatus and technique. The samples that used only polymer (1% P4VP) as the "sealing" agent showed minimal effectiveness (Samples 52-1, 52-2 and 52-3) with only a 5% reduction in comparison to the control sample of polycarbonate substrate. The remaining three samples (Samples 52-4, 52-5 and 52-6) contained a polymer/carbon nanotube composite (1% P4VP with 0.5% carbon nanotubes). The results are shown in FIG. 14.

TABLE 6

Impact testing results[a] for the polymer-composite samples described above (vs. uncoated polycarbonate).

| Sample | $F_{res}$, N | % Res vs. Control |
|---|---|---|
| 52-4 | 463 | 84 |
| 52-5 | 438 | 79 |
| 52-6 | 459 | 83 |
| 52-5 + 52-6 | 301 | 66 |

[a]Control sample (2 polycarbonate) shows $F_{res}$ = 551N; Control sample (3 polycarbonate) shows $F_{res}$ = 439N.

A different substrate (Rinzl) and stacking a series of substrates with a single gradient (each nanosphere layer is followed by a polymer+carbon nanotube layer) may also be used. Ten samples were produced and provide a measure of reproducibility. The results are presented in Table 7.

TABLE 7

Impact testing results[a] for the polymer composite Rinzl substrate samples described above.

| Sample | $F_{res}$, N | Res vs. Control |
|---|---|---|
| 55-1 | 546 | 89 |
| 55-2 | 539 | 88 |
| 55-3 | 615 | 101 |
| 55-4 | 528 | 86 |
| 55-5 | 567 | 92 |
| 55-6 | 570 | 92 |
| 55-7 | 568 | 92 |
| 55-8 | 564 | 91 |
| 55-9 | 581 | 94 |
| 55-10 | 559 | 90 |

[a]Control sample (two polycarbonate + one Rinzl) shows $F_{res}$ = 611N.

There is a minimum of 10% reduction for a single continuous gradient and, it should be pointed out, that this gradient, in terms of the selection of nanosphere sizes, has not been optimized. It may be expected, based on Equation (1), a greater reduction effect for nanospheres that change diameter in a regular step size.

We stacked these samples to increase the residual force and compare the measured result to the predicted result, which is the product of the individual samples. For example, samples 55-4 and 55-8 were stacked and the residual force was compared to that measured for a control that consisted of two polycarbonate substrates sandwiching two Rinzl substrates. The reduction in residual force was measured to be 17% compared to a predicted value of 21%. Samples 55-1 and 55-2 provided a measured reduction of 21% versus a predicted value of 22%. Rinzl is a soft plastic and the combined effect of stacked Rinzl substrates with the coating is effective.

Figure 16:
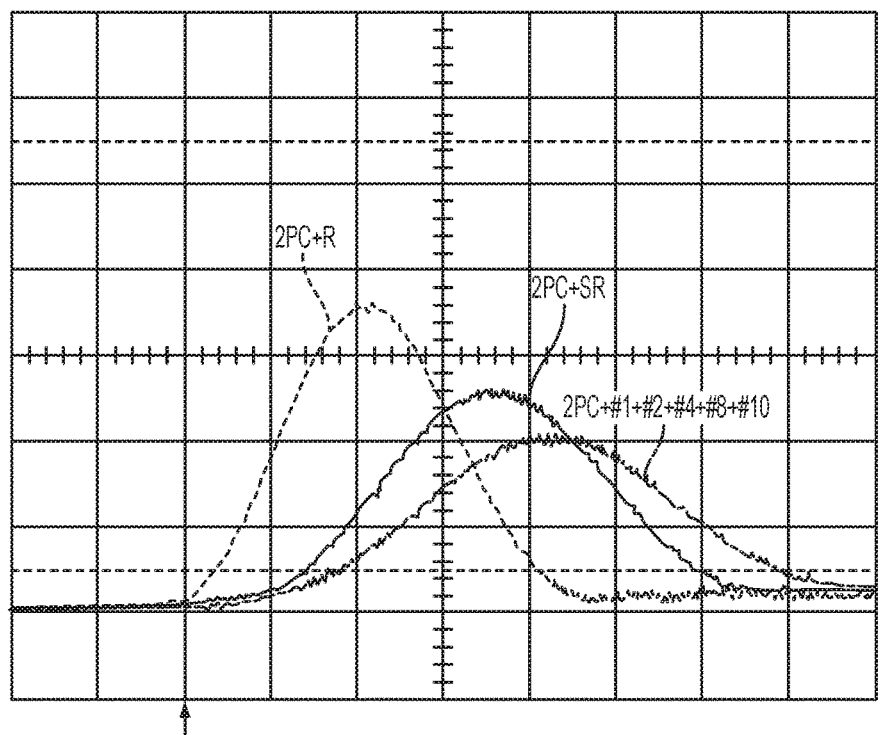
FIG. 16 is a graph showing a shock attenuation effect from polycarbonate substrates, polycarbonate sandwiching five Rinzl substrates and five stacked coated Rinzl substrates sandwiched by polycarbonate.
Figure 17:
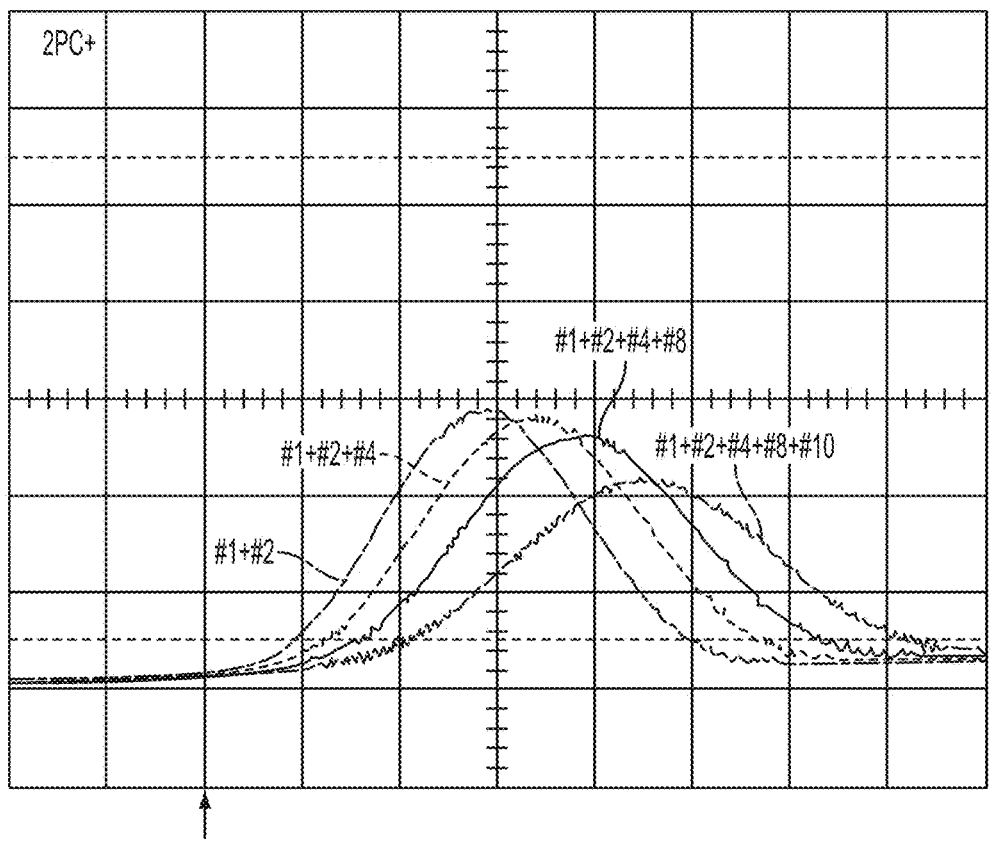
FIG. 17 is a graph showing a shock attenuation effect from stacked coated Rinzl substrates sandwiched by polycarbonate.

As can be seen in FIG. 14, the coating not only reduces the maximum residual force, but also spreads integrated force (the area under the curve) over a broader time frame. This effect is more pronounced for the stacked Rinzl samples. In FIG. 16, the sensor output is presented as a function of the sample. It is shown that the signal spreads for an increased number of Rinzl substrates sandwiched between the polycarbonate samples, comparing a single Rinzl piece to five Rinzl pieces. More important to the use of the coating, the third curve shows the impact of the dropped weight on five of our coated Rinzl pieces. The reduced residual force and widening spread are clearly shown. FIG. 17 presents the force vs. time curves for an increasing number of coated Rinzl pieces between two polycarbonate substrates. The trend is clear.

The results presented in the tables and figures described above indicate that the best demonstration of the shock attenuation effect occurred in three different scenarios: (1) multiple applications of continuous gradients carefully applied so as to not disturb previous layers; (2) when multiple continuous (or alternating two sized, solid hollow) gradients were produced with a polymer/carbon nanotube composite between two adjacent nanosphere layers and (3) when a single continuous gradient with interspersed composite layers was produced on a soft substrate and these coated substrates were stacked to multiply the effect.

As described herein, gradient nanoparticle composites may be used to attenuate impact waves or shock waves. Similarly, alternating arrangements of nanoparticle gradient plus carbon nanoparticle layer may be used for protection from incident shock waves in a variety of scenarios. These materials may be applied either as coatings or supported in a sandwich-like configuration between two polymer sheets and inserted into a device.

Alternative embodiments may involve a structure that incorporates alternating nanoparticle layers with very thin (approximately 50-100 nm) layers of a polymer or a polymer-carbon nanotube composite. The carbon nanotubes may be functionalized with carboxylic acid or amine groups to improve compatibility with the gradient nanoparticles. The concept is to provide a "sealing" layer between the nanoparticle layers without affecting the mismatching of the incident wave to the varying nanoparticle sizes. This "sealing" layer may be applied to any of the gradients discussed herein.

Figure 9:
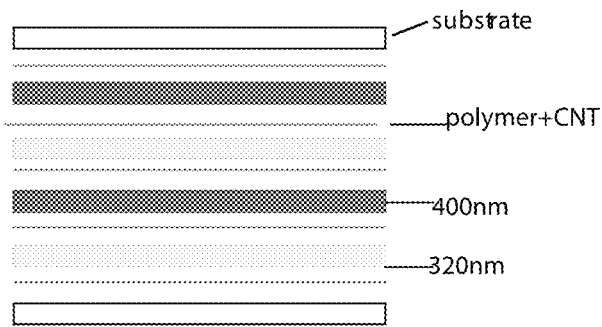
FIG. 9 is a schematic diagram of one embodiment of alternating gradient nanoparticle structures and polymer and/or polymer/CNT composite layers.

FIG. 9 is a schematic diagram of an embodiment of alternating gradient nanoparticle structures and polymer and/or polymer/CNT composite layers. FIG. 9 shows a system that employs two nanoparticle sizes plus an approximately 2.5% poly(4-vinylphenol) plus an approximately 0.5% carboxylic acid functionalized multi-walled carbon nanotube (CNT) solution. Preferred ratios may range from approximately 0.1% to 20%, more preferably approximately 0.2% to 15%, and more preferably approximately 0.5% to 10%. Any polar functionalized nanosphere or nanoparticle may be used, such as amine functionalized where the polymer is PMMA or another nanospherical particle that can be made polar. Gradients may be present between polymer/CNT layers.

Figure 10:
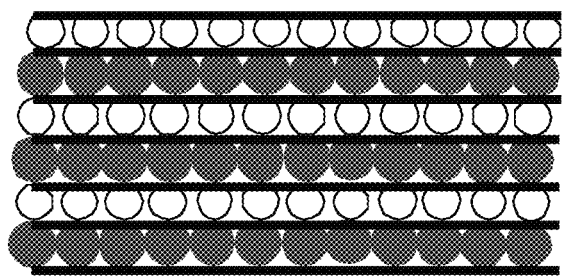
FIG. 10 is a schematic diagram of an example of a gradient nanoparticle structure containing a polymer and polystyrene spheres.

FIG. 10 is a detail of a schematic diagram of an example of a gradient nanoparticle structure containing a polymer and polystyrene spheres as shown in FIG. 9.

Embodiments of the present invention may allow for the use of the polymer and/or polymer/carbon composite layers to mark the end of the layer of one sized nanoparticle before the start of the next.

A sample with five repeats of [polymer (with CNTs)/320 nm polystyrene/400 nm polystyrene] provided a 25% reduction of the incident shock wave after passage through the structure. The nanoparticles may be hollow, solid, or a combination of hollow and solid particles.

Coating Instructions

Materials

All polystyrene nanoparticles suspensions ("white" suspensions) may be approximately 2.5% solids in 50% aqueous buffer/50% ethanol. These may be stored at 4° C. and preferably are sonicated before use for coating. The larger sized nanoparticles, 320 nm and 400 nm, tend to aggregate if stored for a long period. This may be visible by eye if it occurs, since the aggregated particles may settle to the bottom of the container. Sonication of these suspensions may be carried out until there is no obvious aggregation. Once re-suspended, the larger particles may remain so for several days.

For the smaller particles, 15-20 minutes of sonication may ensure complete mixing.

The polymer solutions may be approximately 1% polymer in ethanol. The composite also may contain approximately 0.5% of carbon nanotubes. These may be stored at room temperature. The polymer or polymer composite should be sonicated for 30 minutes prior to use.

Substrate Preparation

For testing purposes, a 1" square polycarbonate substrate may be used for coating and testing. Other substrates may be used for actual products. The polycarbonate may be washed with a detergent and alcohol prior to coating. Alcohol cleaning may be done carefully. A front and a back may be specified. These substrates may be initially coated with one layer of either the polymer solution or the polymer composite solution (as appropriate) before any polystyrene nanoparticles are deposited.

1. Alternating Nanosphere/Polymer Composite Layer Coatings

In this coating, each polystyrene nanoparticle layer may be followed by a layer of the polymer composite. The polystyrene nanoparticle layer should be from one to five monolayers in depth.

The polymer composite layer should be approximately 50-100 nm thick. After deposition of each layer (polymer composite or polystyrene nanoparticle), a solvent drying period is required. In testing, 15 minutes at 60° C. was used. The critical issue is that each successive layer must not disturb the previous layers, either by solvent interaction or by the forces exerted in the application of the materials.

The ordering of the applications may be as follows: (referred to as 'the gradient'):

130 nm particles/composite/160 nm particles/composite/220 nm particles/composite/280 nm particles/composite/320 nm particles/composite/400 nm particles/composite/320 nm particles/composite/280 nm particles/composite/220 nm particles/composite/160 nm particles/composite/

This gradient may be applied, for example, 5 or more times to each substrate.

Each polystyrene nanoparticle layer may be between approximately 1 and 5 diameters thick. The polymer composite layer should be between approximately 75 and 125 nm thick.

2. Full Nanosphere Gradient/Polymer Composite Layer Coatings

In this coating, the entire polystyrene nanoparticle gradient may be followed by a layer of the polymer composite. The polystyrene nanoparticle layers in the gradient may be from one to five monolayers in depth. The polymer composite layer should be 50-100 nm thick. After deposition of each layer (polymer composite or polystyrene nanoparticle), a solvent drying period may be required. In testing, 15 minutes at 60° C. was used. The critical issue is that each successive layer must not disturb the previous layers, either by solvent interaction or by the forces exerted in the application of the materials.

The ordering of the applications may be as follows: (referred to as 'the gradient')

130 nm particles/160 nm particles/220 nm particles/280 nm particles/320 nm particles/400 nm particles/320 nm particles/280 nm particles/220 nm particles/160 nm particles/130 nm particles/composite This gradient may be applied, for example, 5 or more to each substrate.

Each polystyrene nanoparticle layer should be between approximately 1 and 5 diameters thick. The polymer composite layer should be between approximately 75 and 125 nm thick.

Alternative Coating Instructions

Materials

All polystyrene nanoparticles suspensions ("white" suspensions) may be approximately 2.5% solids in 50% aqueous buffer/50% ethanol. These may be stored at 4° C. and preferably are sonicated before use for coating. The larger sized nanoparticles, 320 nm and 400 nm, tend to aggregate if stored for a long period. This may be visible by eye if it occurs, since the aggregated particles may settle to the bottom of the container. Sonication of these suspensions may be carried out until there is no obvious aggregation. Once re-suspended, the larger particles may remain so for several days.

The polymer solutions may be approximately 1% polymer in ethanol. The composite also may contain approximately 0.5% of carbon nanotubes. These may be stored at room temperature. The polymer or polymer composite should be sonicated for 30 minutes prior to use.

Substrate Preparation

For testing purposes, a 1" square polycarbonate substrate may be used for coating and testing. Other substrates may be used for actual products. The polycarbonate may be washed with a detergent and alcohol prior to coating. Alcohol cleaning may be done carefully. A front and a back may be specified. These substrates may be initially coated with one layer of either the polymer solution or the polymer composite solution (as appropriate) before any polystyrene nanoparticles are deposited.

1. Alternating Gradient Nanospheres/Polymer-Carbon Allotrope Composite Layer Coatings The following gradient layered structure, may be repeated, for example, 5 or more times:

Polymer/Carbon Nanotube ["CNT"] composite layer
320 nm particle layer
400 nm particle layer
320 nm particle layer
400 nm particle layer
320 nm particle layer
400 nm particle layer
320 nm particle layer
400 nm particle layer
320 nm particle layer
400 nm particle layer 2. Alternating Nanospheres/Polymer-Carbon Allotrope Composite Layer Coatings The following layered structure, may be repeated, for example, 25 or more times:

Polymer/CNT composite layer
320 nm particle layer
Polymer/CNT composite layer
400 nm particle layer Although the foregoing description is directed to the preferred embodiments of the invention, it is noted that other variations and modifications will be apparent to those skilled in the art, and may be made without departing from the spirit or scope of the invention. Moreover, features described in connection with one embodiment of the invention may be used in conjunction with other embodiments, even if not explicitly stated above.

What is claimed is:

1. A sports protective equipment device, comprising:
a base member; and
a plurality of non-metal nanoparticle shock wave attenuating material layers disposed on the base member, each one of the plurality of nanoparticle shock wave attenuating material layers comprising:
  (i) a gradient nanoparticle layer comprising a plurality of nanoparticles, each of the plurality of nanoparticles having one of two or more approximate diameters, wherein the plurality of nanoparticles are arranged in a gradient array based on diameter, wherein the diameters are between approximately 110 nm in diameter and approximately 400 nm in diameter;
  (ii) a carbon allotrope layer disposed in proximity to the gradient nanoparticle layer, the carbon allotrope layer comprising a plurality of carbon allotrope members suspended in a matrix, wherein the carbon allotrope layer reflects a portion of the shock wave to generate destructive interference with residual shock energy, wherein the carbon allotrope members consist essentially of carbon nanotubes; and (iii) wherein said non-metal nanoparticle shock wave attenuating material layers do not shield radio frequency electromagnetic waves.

2. The sports protective equipment of claim 1, wherein the nanoparticle shock wave attenuating material layer comprises a particle layer with particles of approximately 160 nm to approximately 320 nm in diameter, the carbon allotrope layer, and a particle layer with particles of approximately 200 nm to approximately 400 nm in diameter.

3. The sports protective equipment of claim 2, wherein the unit of the particle layer with particles approximately 160 nm to approximately 320 nm in diameter, the carbon allotrope layer, and the particle layer with particles approximately 200 nm to approximately 400 nm in diameter is repeated approximately 25-300 times.

4. The sports protective equipment of claim 1, wherein the nanoparticle shock wave attenuating material layer comprises approximately 5 pairs of a particle layer with particles approximately 160 nm to approximately 320 nm in diameter and a particle layer with particles approximately 200 nm to approximately 400 nm in diameter.

5. The sports protective equipment of claim 4, wherein the unit of the approximately 5 pairs of particle layer with particles approximately 160 nm to approximately 320 nm in diameter and the particle layer with particles approximately 200 nm to approximately 400 nm in diameter is repeated approximately 10-40 times.

6. The sports protective equipment of claim 1, wherein the nanoparticle shock wave attenuating material layer comprises a particle layer with particles approximately 110 nm in diameter, a particle layer with particles approximately 130 nm in diameter, a particle layer with particles approximately 160 nm in diameter, a particle layer with particles approximately 200 nm in diameter, a particle layer with particles approximately 220 nm in diameter, a particle layer with particles approximately 200 nm in diameter, a particle layer with particles approximately 160 nm in diameter, a particle layer with particles approximately 130 nm in diameter, and a particle layer with particles approximately 110 nm in diameter.

7. The sports protective equipment of claim 6, wherein the unit of the particle layer with particles approximately 110 nm in diameter, the particle layer with particles approximately 130 nm in diameter, the particle layer with particles approximately 160 nm in diameter, the particle layer with particles approximately 200 nm in diameter, the particle layer with particles approximately 220 nm in diameter, the particle layer with particles approximately 200 nm in diameter, the particle layer with particles approximately 160 nm in diameter, the particle layer with particles approximately 130 nm in diameter, and the particle layer with particles approximately 110 nm in diameter particle layer is repeated at least once.

8. The sports protective equipment device of claim 1, wherein the base member comprises a high mass member, and wherein the high mass member comprises a material selected from a list of materials consisting of: ultra-high molecular weight polyethylene, polycarbonate, expanded polypropylene, vinyl nitrile, ABS plastic, para-aramid synthetic fiber composite, a carbon fiber composite, and combinations thereof.

9. The sports protective equipment device of claim 1, wherein the plurality of nanoparticle shock wave attenuating material layers comprises at least 3 gradient nanoparticle layers and at least 3 carbon allotrope layers.

10. The sports protective equipment device of claim 1, wherein the carbon allotrope layer is disposed adjacent to the gradient nanoparticle layer.

11. The sports protective equipment device of claim 1, wherein the sports protective equipment device is a helmet.

12. The sports protective equipment device of claim 11, wherein the helmet comprises an outer shell and an inner shell, wherein the nanoparticle shock wave attenuating material is located at least partially between the outer shell and the inner shell.

13. The sports protective equipment device of claim 11, wherein the helmet comprises a plurality of gradient nanoparticle layers alternating with a plurality of carbon allotrope layers.

14. The sports protective equipment device of claim 11, wherein the helmet further comprises a shock-absorbing foam liner.

15. The sports protective equipment device of claim 1, wherein the nanoparticle shock wave attenuating material layer is coated on at least a portion of the base member.

16. The sports protective equipment device of claim 1, wherein the base member is a fiber.

17. The sports protective equipment device of claim 1, wherein the base member is a textile.

18. The sports protective equipment device of claim 17, wherein the sports protective equipment device is between layers of other fabrics.

19. The sports protective equipment device of claim 1, wherein the base member is a helmet liner.

20. The sports protective equipment device of claim 1, wherein the base member is a helmet pad.

21. The sports protective equipment device of claim 1, wherein the base member is an existing piece of sports equipment.

* * * * *